(12) United States Patent
Livesay

(10) Patent No.: US 11,763,273 B2
(45) Date of Patent: *Sep. 19, 2023

(54) METHOD AND SYSTEM FOR RECORDING FORWARD ROYALTIES USING A DISTRIBUTED LEDGER

(71) Applicant: CopyForward Inc., Winston-Salem, NC (US)

(72) Inventor: Jeff Livesay, Winston-Salem, NC (US)

(73) Assignee: CopyForward Inc., Winston-Salem, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/973,269

(22) Filed: Oct. 25, 2022

(65) Prior Publication Data

US 2023/0048225 A1 Feb. 16, 2023

Related U.S. Application Data

(63) Continuation of application No. 17/746,606, filed on May 17, 2022.

(Continued)

(51) Int. Cl.
*G06Q 40/00* (2023.01)
*G06Q 20/06* (2012.01)
(Continued)

(52) U.S. Cl.
CPC ....... *G06Q 20/065* (2013.01); *G06Q 20/3674* (2013.01); *G06Q 20/3678* (2013.01);
(Continued)

(58) Field of Classification Search
CPC .................................................... G06Q 30/018
See application file for complete search history.

(56) References Cited

U.S. PATENT DOCUMENTS 10,521,780 B1 12/2019 Hopkins, III et al.
10,915,874 B2 2/2021 Code et al.
(Continued)

OTHER PUBLICATIONS

OpenSea Help Center; "How do creator earnings work on OpenSea?"; <https://support.opensea.io/hc/en-us/articles/1500009575482-How-do-creator-earnings-work-on-OpenSea>.

(Continued)

*Primary Examiner* — Ojo O Oyebisi
(74) *Attorney, Agent, or Firm* — MARSHALL, GERSTEIN & BORUN LLP

(57) ABSTRACT

To manage property records using a multi-layered hybrid distributed ledger architecture, identification information for a particular property is obtained and transmitted to at least one participant in a public distributed ledger network for a public distributed ledger layer. Ownership information for the same particular property is obtained and transmitted to at least one participant in a federated distributed ledger network for a federated distributed ledger layer. Transaction-related documents for the same particular property are obtained and transmitted to at least one participant in a private distributed ledger network for a private distributed ledger. The distributed ledger layers are different layers of a property distributed ledger each having a separate set of consensus rules for appending distributed ledger data to the respective layer. This allows for the immutable preservation of royalty terms and conditions for a property or asset using the distributed ledger.

20 Claims, 22 Drawing Sheets

Related U.S. Application Data

(60) Provisional application No. 63/211,298, filed on Jun. 16, 2021, provisional application No. 63/190,081, filed on May 18, 2021.

(51) Int. Cl.
*G06Q 20/36* (2012.01)
*H04L 9/00* (2022.01)
*H04L 9/32* (2006.01)

(52) U.S. Cl.
CPC .............. *H04L 9/3247* (2013.01); *H04L 9/50* (2022.05); *G06Q 2220/123* (2013.01); *H04L 2209/56* (2013.01)

(56) References Cited

U.S. PATENT DOCUMENTS

| | | |
|---|---|---|
| 11,075,766 B1 | 7/2021 | Norton et al. |
| 2018/0285996 A1 | 10/2018 | Ma |
| 2020/0005284 A1 | 1/2020 | Vijayan |
| 2020/0111180 A1 | 4/2020 | Celia |
| 2020/0143469 A1 | 5/2020 | Stewart et al. |
| 2020/0210451 A1* | 7/2020 | Wang .................. G06Q 30/018 |
| 2020/0387967 A1 | 12/2020 | Cella |
| 2021/0090189 A1 | 3/2021 | Blackman et al. |
| 2022/0239495 A1 | 7/2022 | Norton et al. |

OTHER PUBLICATIONS

OpenSea Developers; "10. Setting fees on secondary sales;" <https://docs.opensea.io/docs/10-setting-fees-on-secondary-sales>.

Office Action for U.S. Appl. No. 17/746,606 dated Aug. 5, 2022.

Hester, "Introducing the Mattereum Asset Passport," <https://medium.com/humanizing-the-singularity/introducinq-the-mattereum-asset-passport-72f28c9ba6f1> (Nov. 19, 2019).

Damiani; "SuperRare and Verisart Announce '10x10' NFT Auction Series Featuring Neil Beloufa, Petra Cortright, Shepard Fairey, and More;" Forbes, Mar. 2021. <https://www.forbes.com/sites/jessedamiani/2021/03/01/superrare-and-verisart-announce-10x10-nft-auction-series-featuring-nel-beloufa-petra-cortright-shepard-fairey-and-more/?sh=1bd27a49ccd>.

* cited by examiner

| | 1ST OWNER | 2ND OWNER | 3RD OWNER | 4TH OWNER | 5TH OWNER | 6TH OWNER |
|---|---|---|---|---|---|---|
| 1ST SALE | $100,000 | | | | | |
| 2ND SALE | $10,000 | PAID 100K - SOLD 200K $200,000 | | | | |
| 3RD SALE | $15,000 | $15,000 | PAID 200K - SOLD 300K $300,000 | | | |
| 4TH SALE | $20,000 | $10,000 | $10,000 | PAID 300K - SOLD 400K $400,000 | | |
| 5TH SALE | $25,000 | $8,333 | $8,333 | $8,333 | PAID 400K - SOLD 500K $500,000 | |
| 6TH SALE | $30,000 | $7,500 | $7,500 | $7,500 | $7,500 | PAID 500K - SOLD 600K $600,000 |
| TOTAL NET REVENUE PER OWNER | $100K (SALE) - $5k (CF) + $100K (ROYALTY) = $195,000 NET | $200K (SALE) - $10k (CF) - $10K (OWNER 1) + $40,833 (ROYALTY) $120,833 NET | $300K (SALE) - $15k (CF) - $15K (OWNER 1 & 2) + $25,833 (ROYALTY) $80,833 NET | $400K (SALE) - $20k (CF) - $20K (OWNER 1) - $10K (OWNER 2,3) + $15,833 (ROYALTY) $55,833 NET | $500K (SALE) - $25k (CF) - $25K (OWNER 1) - $8.33K (OWNER 2,3,4) + $7.5K (ROYALTY) $32,500 NET | TBD |

FIG. 13

PORTFOLIO - JACK MIKARY

| | | | | | |
|---|---|---|---|---|---|
| CWK | OWNED | 0 | SPORTS SNEAKERS | $ 250 | $ 3,428 | 1985 AIR JORDAN 1 HIGH BLUE METALLIC-NEVER WORN - STILL IN BOX |
| CWK | OWNED | 0 | SPORTS SNEAKERS | $ 395 | $ 3,500 | BEASTIE BOYS ALL STARS- BRONX |
| CARDS | OWNED | 0 | SPORTS CARD | $ 555,988 | $ 650,000 | TOM BRADY ROOKIE RC AUTO #144PSA 10 GEM MINT |
| CARDS | PURCHASED | 4% | MAGIC CARD | $ 250,000 | $ 300,000 | PSA 10 ALPHA BLACK LOTUS SIGNED BY CHRISTOPHER RUSH |
| CWK | PURCHASED | 6% | SPORTS SNEAKERS | $ 249 | $ 4,200 | PRESTO X SEX AND THE CITY |
| CWK | PURCHASED | 3% | SPORTS SNEAKERS | $ 450 | $ 15,000 | MAHOMES' BRANDED ULTRA BOOST MID PE |
| CARDS | PURCHASED | 2% | SPORTS CARD | $ 428,100 | $ 500,000 | 1952 TOPPS MICKEY MANTLE #311 |
| CARDS | PURCHASED | 4% | SPORTS CARD | $ 208,100 | $ 300,000 | 1986 FLEER BASKETBALL MICHAEL JORDAN ROOKIE CARD #57 PSA 10 |
| CARDS | SOLD | 15% | MAGIC CARD | $ 165,000 | $ 200,000 | BGS ALPHA BLACK LOTUS |
| CARDS | SOLD | 17% | POKEMON CARD | $ 350,100 | $ 400,000 | 1999 POKEMON BASE 1ST EDITION HOLO THICK STAMP SHADOWLWSS HOLO CHA |
| CARDS | SOLD | 14% | POKEMON CARD | $ 295,300 | $ 395,000 | 1999 POKEMON BASE 1ST EDITION THICK STAMP SHADOWLESS HOLO CHARIZAN |
| COMICS | SOLD | 15% | COMIC BOOK | $ 0.10 | $ 598 | SPIDERMAN #1 (NEWSTAND) (2ND) |
| COMICS | SOLD | 15% | COMIC BOOK | $ 0.25 | $ 7,200 | MARVEL SUPERHEROES #13 NEAR-MINT |

1  2  3  4  5  6  7  8  9  10  NEXT

[ADD + ASSET]  [RECORD TRANSFER]  [TRACK ASSETS]  [ACCELERATE ROYALTIES]  [EXCHANGE ROYALTIES]

FIG. 18

| | |
|---|---|
| GENRE | SPORTS SNEAKERS |
| ASSET | AIR JORDAN 10G CHICAGO RED WHITE SIZE 11 850911TY1 1985 |
| OWNER | JACK MIKARY |

NEW OWNER:

| | |
|---|---|
| NAME | CHICKS WITH KICKS |
| PHONE | 561-555-3454 |
| EMAIL | DXP9876@GMAIL.COM |

TERMS:

| | |
|---|---|
| PRICE | $8,750 |
| ROYALTY | 15% |
| BUYOUT? | NONE |

[NOTIFY BUYER]

FIG. 20

METHOD AND SYSTEM FOR RECORDING FORWARD ROYALTIES USING A DISTRIBUTED LEDGER

CROSS-REFERENCE TO RELATED APPLICATIONS

This application is a continuation of U.S. patent application Ser. No. 17/746,606 entitled "Method and System for Recording Forward Royalties Using a Distributed Ledger," filed on May 17, 2022, which claims priority to and the benefit of the filing date of (1) provisional U.S. Patent Application No. 63/190,081 entitled "Method and System for Recording Forward Royalties Using a Distributed Ledger," filed on May 18, 2021, and (2) provisional U.S. Patent Application No. 63/211,298 entitled "Multi-Layered Distributed Ledger Architecture for Property-Related Tasks," filed on Jun. 16, 2021, the entire contents of each of which is hereby expressly incorporated herein by reference.

TECHNICAL FIELD

The present disclosure relates generally to systems and methods to digitally automate and semi-automate tasks involving titles and ownership for real, personal, and intellectual property of any kind. In particular, the system provides a multi-layered infrastructure and platform combining public, federated, and private layers in a distributed ledger that are utilized in a networked environment for performing tasks involving property and property transfer.

BACKGROUND

It is common to use computing systems, methods and devices to perform certain tasks and operations related to identifying property, managing and storing property records and documents, searching, transferring and recording ownership of property, clearing property of encumbrances, and other property-related tasks.

In many cases the use of computing systems, methods and devices can increase the accuracy and efficiency of performing a given property-related operation, task or transaction; however, there are many deficiencies and inefficiencies in the way today's computing systems are used with respect to property, if and when they are used at all.

Even in today's highly digitized and automated world, a high percentage of activities surrounding the identification, recordation, ownership, disencumbering, transfer, and management of property are manual, inefficient, inaccurate, non-secure and subject to costly errors, fraud, abuse, corruption, and theft.

There are three (3) main types of tangible and intangible property. The first type of property is real property which includes land, agricultural, residential, industrial and commercial real estate and any improvements thereon. The second type of property is personal property which includes vehicles, watercraft, aircraft, art, gems, jewelry, appliances and essentially any property that is movable. The third type of property is intellectual property which includes intangible creations of the human intellect such as patents, copyright, industrial design rights, trademarks, plant variety rights, trade dress, geographical indications, trade secrets, utility models, service marks, and trade names.

Many types of property and associated documents, such as titles and deeds, are recorded in registries such as land registries, registrars, registers of deeds, departments and bureaus of motor vehicle registries, vessel registries, aircraft registries, patent and trademark offices, and so forth.

Property registries vary by jurisdiction including by country, state, province, district, sub-district, county, parish, and local municipalities (e.g. cities, villages, settlements, communes and the like).

The most fragmented type of registries are registries for real property; these land registries are typically highly localized such as in the United States where each of the approximately 3,100 counties, boroughs, census areas, and parishes have their own unique registry or registrar for real property. Some countries have only one national land registry. Historically there have been numerous jurisdictions where there are no property registries at all, such as several countries in Africa and other countries such as Afghanistan.

Somewhat less fragmented are registries for vehicles and watercraft, such as in the United States where these tend to consist of one statewide or territory-wide registry, typically managed for vehicles by a state Department or Bureau of Motor Vehicles, and typically for boats by a state Wildlife Resources Commission, a Department of Natural Resources Conservation, or the like.

Additionally, the United States Coast Guard operates a national registry for water vessels, the National Vessel Documentation Center, and there are numerous international registries for yachts and ships, including separate registries maintained by most countries.

Another national registry for personal property in the United States was created when federal law established the Federal Aviation Administration (FAA) Civil Aviation Registry as the location for filing title and lien documents affecting U.S. registered aircraft.

One national registry in the United States is for intellectual property and is operated by the U.S. Patent and Trademark Office (USPTO) which records certain forms of intellectual property including patents, trademarks, and registered copyrights.

There are also certain fully international registries, such as the electronic International Registry (IR) for aircraft formed by The Cape Town Treaty and operated under the legal framework of the Cape Town Convention and Aircraft protocol adopted by many countries in 2001.

Some registries are electronic and fully digital; other registries are still manual/paper-based; and other registries are hybrids, with both digital records and paper records.

The Peruvian economist Hernando DeSoto has estimated that worldwide, the value of 'dead capital'—in which people do not have legal title to their houses, cars and other assets at $20 trillion. According to New America in December 2020, inaccessible land assets represent a major impediment to international economic development, with an estimated $9.3 trillion in global assets locked because of inadequate proof of ownership. The World Bank has reported that as of 2017, more than 70 percent of the world's population does not have any legally registered title to their land.

In jurisdictions where there no registries, or where the registries are still manual, outright fraud and theft of property are not difficult to commit. Even in jurisdictions where there are electronic registries, the registries are typically based on old "legacy systems" and outdated technology, such as, for example, state vehicle registries still existing in the archaic database technology called "DB2." Today's property registries can be manipulated, and, in some jurisdictions, there is widespread abuse, fraud, corruption, and theft of property due to the inability to immutably record property ownership. Today's registries do not utilize common infrastructure or standards, are not interoperable, are fragile, brittle, difficult to modify or enhance, and are expensive to maintain.

There are many possible mistakes, errors, and encumbrances related to property titles, called title defects, such that if defects are still present and uncleared at the time of closing on the sale of a property, the transfer can become invalidated, and the buyer can even sue the seller. There are many types of defects in titles, most of which are recorded defects introduced by human errors and which are herein referred to as Human Induced Defects (HIDs) which often come in the form of mistyped names, transcription errors from paper-based documents and other non-automated sources, and missing property descriptions or incorrect legal descriptions.

Title defects for personal property such as vehicles can include incorrect owner information (e.g., misspelled name, address), incorrect mileage, transcription errors, incorrect make, year model, or body style, incorrect lienholder(s), dates of lien(s), and lien release(s), and incorrect title number or incorrect Vehicle Identification Number (VIN), or in the case of boats, an incorrect boat length, hull type, or Hull Identification Number (HIN). Title defects for aircraft can include separate encumbrances on the airframe, the propeller(s), and the engine(s), and an aircraft without clean title is said to have a "cloud on the title" which prevents closing on the sale of the aircraft. Title defects for real property can include, ineffective notarial clauses, invalid powers of attorney, deeds by minors, improperly recorded documents, undisclosed heirs, gaps in the chain of title, false impersonations, errors in tax records, IRS or tax liens, forged documents, and non-recorded defects which include bankruptcy, divorce, civil litigation, child support, liens (IRS, nuisance), and violations (municipal codes, utilities). These title defects can block the transfer of a property and non-recorded defects can impact marketability of title to a property.

Some projects have been developed which attempt application of blockchain to the domain of real property registration and land title related activities. These projects have typically targeted a single jurisdiction such as one country or one municipality. These projects, pilots, and attempts to use blockchain for storing real property titles and related information suffer many drawbacks, defects, and shortcomings in their approach that hinder their success. These projects are typically only able to work for small, narrowly scoped problems, classes of properties, and jurisdictions, which leads to unscalable, un-reusable results. Additionally, these projects have used proprietary, custom-built blockchains that tend to be limited, one-off solutions that work only for a single jurisdiction or a small, limited number of simple jurisdictions. Moreover, the attempts to apply DLT to real property have developed a single-purpose solution that only works for a single use case or a small handful of related use cases. Furthermore, these projects have used proprietary, closed solutions that do not allow widespread industry participation or global participation in the design and development of the solutions nor do they allow open participation in the governance, particularly among incumbent participants in the property industry who do not directly benefit economically from the attempts to date.

Moreover, these projects have attempted to store all information related to each property in a single blockchain layer. As Michael Graglia and Christopher Mellon wrote in their report, "Blockchain and Property in 2018," while land documents have to be stored somewhere, current public blockchains are not able to handle large amounts of land data, such as deeds, titles, and maps.

All of these disadvantages work together to increase the difficulty of and/or limit the usability of current/previous approaches to using public blockchains for recording property information.

SUMMARY

The present disclosure relates to Distributed Ledger Technology (DLT) which enables digital systems to record the characteristics of assets along with transactions and operations performed on assets in which the transactions, operations and their details are recorded in multiple places at the same time.

Unlike traditional databases, distributed ledgers have no central data store. The present disclosure relates to private ledgers which are permissioned distributed ledger systems where a single authority or organization has write-access to the network and control over read permissions can be public or restricted if a public readability feature is included in the private ledger. The present disclosure also relates to public ledgers which are databases that are consensually shared and synchronized across multiple sites, institutions, or geographies, accessible by multiple people and systems, and allowing transactions to have public "witnesses," and participants at each node of the network can access the recordings shared across that network and can own identical copies of it; any changes or additions made to the ledger are reflected and copied to all participants. Moreover, the present disclosure relates to federated ledgers, which are hybrid public/private ledgers that are similar to private ledgers, but which remove the sole organization influence from the network and enable multiple entities to use the network for their benefit as a hub where the multiple organizations can simultaneously exchange information and work, enabling participants to "fast forward" any kind of work requiring multiple entities to participate or approve transactions. The present disclosure relates to cross-ledger interoperability between two relatively independent ledgers, which allows ledgers to speak to one another because they are built in a standardized way, and which cross-ledger implementation is mainly represented by asset swap and asset transfer, and with which cross-ledgers the limitations of a single ledger can be avoided.

Furthermore, the present disclosure relates to smart contracts which are computerized transaction protocols that execute terms of a contract and can be self-executing; in effect, a smart contract has a conditional or an "if" component (in artificial intelligence terminology, called the "left hand side" of a rule), and also has an executable or "then" component (in AI terminology, called the "right hand side" of a rule), with the difference being that a smart contract "watches" a distributed ledger for its conditions to be met at which point it "fires" or executes and immutably records its actions (contract) on the distributed ledger.

Additionally, the present disclosure relates to copyforward which is a new practice to manage ownership and rights for a property whereby the creator or current owner of a property specifies permanent or semi-permanent contractual terms and conditions, such as royalties and permitted uses, which are permanently and immutably affixed to the property and stored in a distributed ledger, and passed with the property from owner to owner, thus implementing a hybrid of copyright, copyleft, and droit de suite utilizing the present disclosure, which means arbitrarily complex sets of terms and conditions can "follow" a property from owner to owner using copyforward.

Techniques, systems, apparatuses, components, devices, and methods are disclosed for utilizing a distributed ledger, or blockchain, for managing property records. For example, in a property recordation system, a distributed ledger may be maintained by nodes. To manage and record property information in a manner that is secure, immutable, and trustless without overloading a blockchain with so much data that it becomes nearly impossible to maintain, the present disclosure utilizes a multi-layered hybrid distributed ledger architecture. Each layer manages and records a different type of property information for the same property, where the most decentralized layer includes the least amount of data per property.

More specifically, the multi-layered hybrid distributed ledger architecture includes a public distributed ledger layer which is accessible by multiple people and systems, is permissionless, and allows transactions to have public "witnesses." Participants at each node of the network can access the recordings shared across that network and can own identical copies of it. Any changes or additions made to the public distributed ledger layer are reflected and copied to all participants. The public distributed ledger layer obtains identification information for properties. The identification information may uniquely identify a property and may be static and immutable in the public distributed ledger layer.

The multi-layered hybrid distributed ledger architecture also includes a federated distributed ledger layer which requires nodes to receive permission to append data to the federated distributed ledger layer. Control over read permissions can be public or restricted if a public readability feature is included in the federated ledger layer. If read permissions are restricted, a user attempting to view the federated ledger layer may need to enter a user name and password for authentication. The federated distributed ledger layer obtains ownership information for properties. The ownership information may indicate transfers of ownership of a property from one owner to another, the dates of the transfers, the sale prices of the transfers, encumbrances on the property, etc. The ownership information may be dynamic and more memory intensive than the identification information. Moreover, the ownership information may be more sensitive and private than the identification information. Accordingly, the ownership information is managed by the federated distributed ledger layer rather than a public distributed ledger layer that can be accessed by any computing device.

Still further, the multi-layered hybrid distributed ledger architecture includes a private distributed ledger layer where a single authority or organization has write-access to the network and control over read permissions can be public or restricted if a public readability feature is included in the private ledger. If read permissions are restricted, a user attempting to view the private ledger layer may need to enter a user name and password for authentication. The private distributed ledger layer obtains transaction-related documents for properties. The transaction-related documents may include contracts, title documents, deeds, documents describing encumbrances, mortgages, liens, lease documents, etc. The transaction-related documents may be dynamic and more memory intensive than the identification information and the ownership information. Moreover, the transaction-related documents may be more sensitive and private than the identification information and ownership information. Accordingly, the transaction-related documents are managed by a single authority or organization rather than a public distributed ledger layer that can be accessed by any computing device, or a federated distributed ledger layer that can be accessed by multiple organizations which may not have permission to view the transaction-related documents from the people or organizations associated with the transaction-related documents.

The distributed ledger layers in the multi-layered hybrid distributed ledger architecture may reference each other so that a user may obtain property information for the same property from each of the layers. For example, a user may mint a non-fungible token (NFT) representing a property on the public ledger layer, where the NFT includes identification and ownership information for the property. The NFT may be wrapped in wrapped NFTs on the federated and private distributed ledger layers, such that the ledger layers may reference each other through the NFT and wrapped NFTs referring to the NFT. In other implementations, the distributed ledger layers may reference each other using any suitable combination of identifiers and/or cross-chain tools, such as asset identifiers, creator identifiers, chain identifiers, digital certificate of authenticity identifiers, owner identifiers, transaction identifiers, user identifiers, RDF identifiers, location identifiers, etc.

One example embodiment of the techniques of this disclosure is a system for managing property records using a multi-layered hybrid distributed ledger architecture. The system includes one or more processors and a non-transitory computer-readable medium coupled to the one or more processors and storing instructions thereon. The instructions, when executed by the one or more processors, cause the one or more processors to obtain identification information for a particular property, and transmit the identification information for the particular property to at least one participant in a public distributed ledger network of participants maintaining a public distributed ledger layer. Additionally, the instructions cause the one or more processors to obtain ownership information for the same particular property, and transmit the ownership information for the same particular property to at least one participant in a federated distributed ledger network of participants maintaining a federated distributed ledger layer. The federated distributed ledger network participants have permission to append distributed ledger data to the federated distributed ledger layer. Furthermore, the instructions cause the one or more processors to obtain one or more transaction-related documents for the same particular property, and transmit the one or more transaction-related documents for the same property to at least one participant in a private distributed ledger network of participants maintaining a private distributed ledger. The private distributed ledger network participants each correspond to a same entity. The public distributed ledger layer, the federated distributed ledger layer, and the private distributed ledger layer are different layers of a property distributed ledger each having a separate set of consensus rules for appending distributed ledger data to the respective layer.

Another example embodiment of the techniques of this disclosure is a system for managing property records using a plurality of validating network nodes in a multi-layered hybrid distributed ledger architecture. The system includes a first validating network node in a public distributed ledger network. The first validating network nodes includes a first transceiver configured to exchange public distributed ledger data with a first set of peer network nodes. The public distributed ledger data including identification information for properties. The first validating network node also includes a first storage media configured to store a copy of a public distributed ledger layer, and a first validator configured to apply a first set of consensus rules to the public distributed ledger data received from the first set of peer network nodes. The system also includes a second validating network node in a federated distributed ledger network. The second validating network node includes a second transceiver configured to exchange federated distributed ledger data with a second set of peer network nodes. The federated distributed ledger data includes ownership information for the same properties. The second validating network node also includes a second storage media configured to store a copy of a federated distributed ledger layer, and a second validator configured to apply a second set of consensus rules to the federated distributed ledger data received from the second set of peer network nodes. The second validating network node has permission to participate in the federated distributed ledger network. Furthermore, the system includes a third validating network node in a private distributed ledger network. The third validating network node includes a third transceiver configured to private distributed ledger data with a third set of peer network nodes. The private distributed ledger data includes transaction-related documents for the same properties. The third validating network node also includes a third storage media configured to store a copy of the private distributed ledger layer, and a third validator configured to apply a third set of consensus rules to the private distributed ledger data received from the third set of peer network nodes. The third set of peer network nodes correspond to a same entity. The first, second, and third sets of consensus rules are different, and for a particular property, the public, federated, and private distributed ledger layers reference each other.

Yet another example embodiment of the techniques of this disclosure is a system for managing encumbrances associated with assets using a distributed ledger maintained by a plurality of participants. The system includes one or more processors and a non-transitory computer-readable medium coupled to the one or more processors and storing instructions thereon. The instructions, when executed by the one or more processors, cause the one or more processors to identify an encumbrance on an asset when the asset is transferred from a first owner to a second owner. Additionally, the instructions cause the one or more processors to generate a transaction including a transfer of the asset from the first owner to the second owner and a description of the encumbrance. Moreover, the instructions cause the one or more processors to transmit the transaction to at least one other participant in a distributed ledger network of participants maintaining a distributed ledger.

Another example embodiment of the techniques of this disclosure is a method for managing encumbrances associated with assets using a distributed ledger maintained by a plurality of participants. The method includes identifying an encumbrance on an asset when the asset is transferred from a first owner to a second owner. Moreover, the method includes generating a transaction including a transfer of the asset from the first owner to the second owner and a description of the encumbrance, and transmitting the transaction to at least one other participant in a distributed ledger network of participants maintaining a distributed ledger.

Yet another example embodiment of the techniques of this disclosure is a system for presenting indications of encumbrances associated with assets using a distributed ledger maintained by a plurality of participants. The system includes a user interface, one or more processors, and a non-transitory computer-readable medium coupled to the user interface and the one or more processors and storing instructions thereon. The instructions, when executed by the one or more processors, cause the one or more processors to present, via the user interface, a display of assets associated with a first owner. The instructions further cause the one or more processors to receive, via the user interface, a request to transfer ownership of one of the assets from the first owner to a second owner, receive, via the user interface, a description of an encumbrance on the asset. Furthermore, the instructions cause the one or more processors to transmit a transaction including a transfer of the asset from the first owner to the second owner and the description of the encumbrance to at least one other participant in a distributed ledger network of participants maintaining a distributed ledger, and present, via the user interface, an updated display of the assets associated with the first owner including the description of the encumbrance of the asset transferred to the second owner.

BRIEF DESCRIPTION OF THE DRAWINGS

FIG. 13 illustrates an example display of the revenue received by each owner in a copyforward system.

FIG. 18 illustrates an exemplary display of the assets associated with a user, including encumbrances on the assets resulting in royalty payments owed to the user.

FIG. 20 illustrates an exemplary display for entering the terms of an agreement between the buyer and seller of an asset, including encumbrances placed on the asset as a result of the sale.

DETAILED DESCRIPTION

Figure 1:
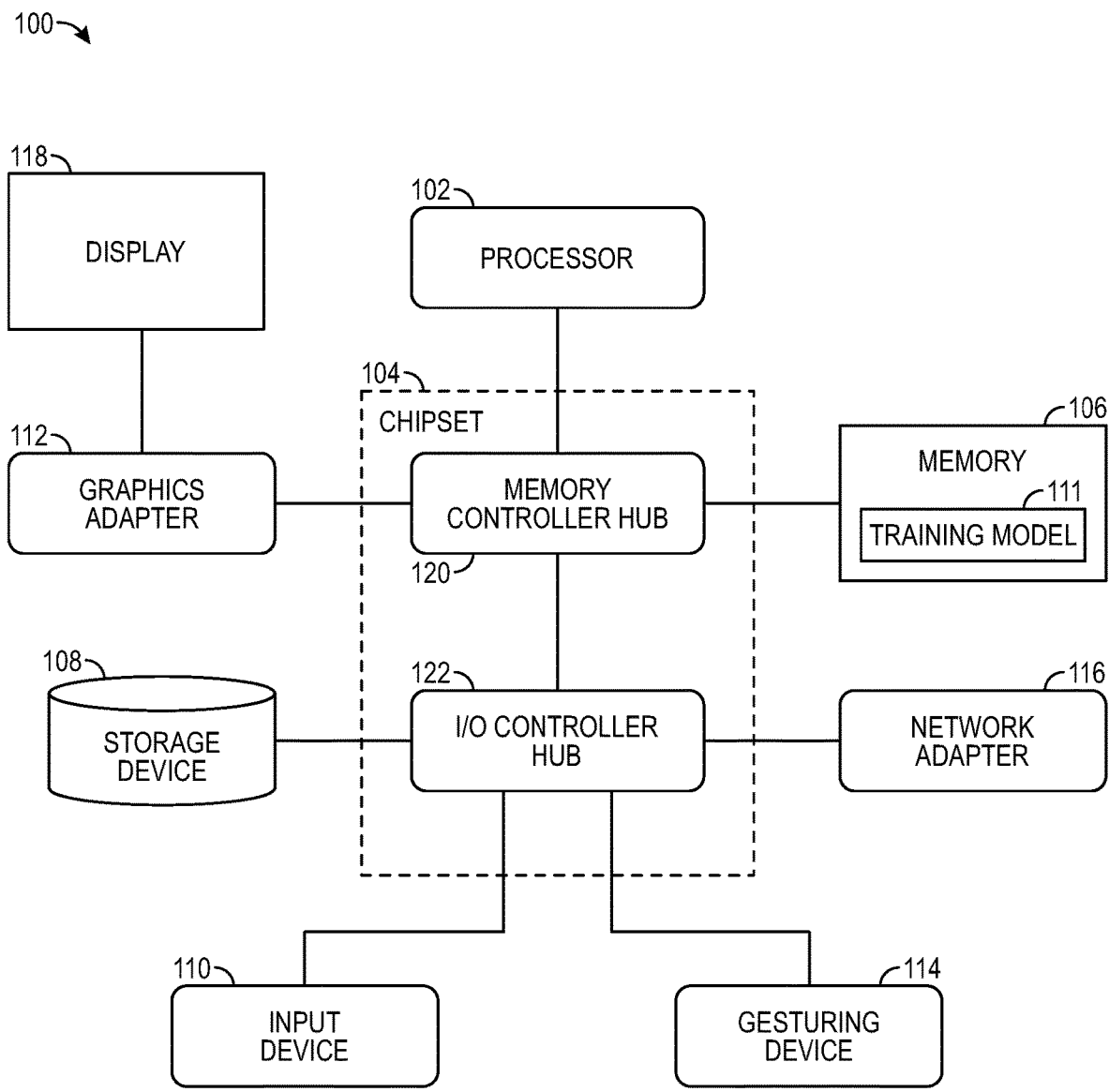
FIG. 1 is a block diagram illustrating an example computer in accordance with an illustrative embodiment.

A distributed ledger is a storage mechanism for data, events, transactions, etc. that is maintained by several participants. More specifically, a distributed ledger is a way of achieving a distributed consensus on the validity or invalidity of information recorded in the distributed ledger. In other words, the distributed ledger provides a decentralized trust to participants and observers. As opposed to relying on a central authority, a distributed ledger is a decentralized database in which a transactional record of changes to the ledger is maintained and validated by each node of a peer-to-peer network. One type of distributed ledger, a blockchain, is comprised of groupings of transactions organized together into a "block," and ordered sequentially (thus the term "blockchain"). While the distributed ledgers discussed herein are referred to in the context of a blockchain, this is merely one example of a distributed ledger. Distributed ledgers may also include a tangle, a block lattice, or other directed acyclic graph (DAG). In any event, nodes may join and leave the blockchain network over time and may obtain blocks from peer nodes that were propagated while the node was gone. Nodes may maintain addresses of other nodes and exchange addresses of known nodes with one another to facilitate the propagation of new information across the network in a decentralized, peer-to-peer manner.

The nodes that share the ledger form what is referred to herein as the distributed ledger network. The nodes in the distributed ledger network validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supply a proof-of-identity such that only approved entities may originate changes to the chain. A consensus rule may require that blocks and transactions adhere to format requirements and supply certain meta information regarding the change (e.g., blocks must be below a size limit, transactions must include a number of fields, etc.). Consensus rules may include a mechanism to determine the order in which new blocks are added to the chain (e.g., through a proof-of-work system, proof-of-stake, etc.).

Additions to the blockchain that satisfy the consensus rules are propagated from nodes that have validated the addition to other nodes that the validating node is aware of. If all of the nodes that receive a change to the blockchain validate the new block, then the distributed ledger reflects the new change as stored on all nodes, and it may be said that distributed consensus has been reached with respect to the new block and the information contained therein. Any change that does not satisfy the consensus rule is disregarded by validating nodes that receive the change and the change is not propagated to other nodes. Accordingly, unlike a traditional system which uses a central authority, a single party cannot unilaterally alter the distributed ledger unless the single party can do so in a way that satisfies the consensus rules. The inability to modify past transactions leads to blockchains being generally described as trusted, secure, and immutable.

The validation activities of nodes applying consensus rules on a blockchain network may take various forms. In one implementation, the blockchain may be viewed as a shared spreadsheet that tracks data such as the ownership of assets. In another implementation, the validating nodes execute code contained in "smart contracts" and distributed consensus is expressed as the network nodes agreeing on the output of the executed code.

A smart contract is a computer protocol that enables the automatic execution and/or enforcement of an agreement between different parties. In particular, the smart contract may be computer code that is located at a particular address on the blockchain. In some cases the smart contract may run automatically in response to a participant in the blockchain sending funds (e.g., a cryptocurrency such as bitcoin, ether, or other digital/virtual currency) to the address where the smart contract is stored. Additionally, smart contracts may maintain a balance of the amount of funds that are stored at their address. In some scenarios when this balance reaches zero the smart contract may no longer be operational.

The smart contract may include one or more trigger conditions, that, when satisfied, correspond to one or more actions. For some smart contracts, the action(s) performed may be determined based upon one or more decision conditions. In some instances, data streams may be routed to the smart contract so that the smart contract may detect that a trigger condition has occurred and/or analyze a decision condition.

Blockchains may be deployed in a public, decentralized, and permissionless manner meaning that any party may view the distributed ledger, submit new information to be added to the ledger, or join the network as a validating node. Other blockchains are private (e.g., permissioned ledgers) that keep chain data private among a group of entities authorized to participate in the blockchain network. Other blockchain implementations may be both permissioned and permissionless whereby participants may need to be validated, but only the information that participants in the network wish to be public is made public.

In some implementations, a distributed ledger includes multiple blockchains such as a main blockchain and several side chains operating independently of the main blockchain. The side chains then interact with the main blockchain to provide some of the transaction data from the side chains to the main blockchain. In this manner, the side chains can be permissioned or private while the main blockchain is public or available to a larger number of entities than the side chains. Non-sensitive information from the side chains may be shared on the main blockchain. Also in some implementations, a distributed ledger includes multiple layers or separate blockchains executing in parallel that are maintained by the same validating nodes. Some of the transaction data from the blockchain for the first layer may be provided to the blockchain for the second layer or vice versa.

In one example, a distributed ledger in a property recordation system may be maintained by validating nodes which transmit data to remote systems using one or more public and/or private networks, such as a private enterprise network, the Internet, a cellular router, a backhaul Internet or other type backhaul connection. The validating nodes receive transactions broadcasted to the distributed ledger network by for example, user devices. The nodes then validate the broadcasted transactions.

In another example, the validating nodes execute code contained in "smart contracts" and other devices act as "evidence oracles" which provide evidence related to title transfers, encumbrances, etc. to the blockchain. Oracles may be systems, devices, or entities that connect a deterministic system with a non-deterministic system or data source.

In the following description, for the purposes of explanation, specific details are set forth in order to provide a thorough understanding of various implementations and examples. Various implementations may be practiced without these specific details. The figures and description are not intended to be restrictive.

FIG. 1 is a block diagram illustrating a computing system 100 for creating an intelligent and immersive training scenario and for assessing and evaluating trainee performance with respect to the training scenario according to one example of the present disclosure. In other examples, fewer, additional, or different components may be present. The computing system 100 may be any suitable computing machine such as a tablet, smart phone, laptop computer, desktop computer, server, remote client device, gaming device, smart television device, wearable computer, or any combination thereof. The computing system 100 can include at least one processor 102 coupled to a chipset 104. The chipset 104 can include a memory controller hub 120 and an input/output (I/O) controller hub 122. A memory 106 and a graphics adapter 112 can be coupled to the memory controller hub 120. A display 118 can be coupled to the graphics adapter 112. A storage device 108, input device 110, gesturing device 114, and network adapter 116 can be coupled to the I/O controller hub 122. Other examples of the computing system 100 may be characterized by different architectures.

The storage device 108 can include a non-transitory computer-readable storage medium such as a hard drive, compact disk read-only memory (CD-ROM), DVD, or a solid-state memory device. The memory 106 can include instructions and data usable by the processor 102. The gesturing device 114 can include a computer mouse, track ball, or other type of gesturing device, and can be used in combination with the input device 110 to input data into the computing system 100. The gesturing device 114 may also be a gaming system controller, or any type of device used to control a gaming system. For example, the gesturing device 114 may be connected to a video or image capturing device that employs biometric scanning to detect a specific user. The specific user may employ motions or gestures to command the gesturing device 114 to control various aspects of the computing system 100.

The graphics adapter 112 can display images and other information on the display 118. The network adapter 116 can couple the computing system 100 to one or more computer networks. The computing system 100 can be adapted to execute computer program modules for providing functionality or the operations described herein. As used herein, the term module refers to computer program logic used to provide the specified functionality. Thus, a module can be implemented in hardware, firmware, or software. In some examples, program modules can be stored on the storage device 108, loaded into the memory 106, and executed by the processor 102.

The types of computers used by the entities and processes disclosed herein can vary depending on the example and processing power of the associated entity. The computing system 100 may be a mobile device, tablet, smartphone or any sort of computing element with the above-listed elements. For example, a data storage device, such as a hard disk, solid state memory, or storage device may be stored in a distributed database system including various blade servers working together to provide the functionality described herein. The computers can lack some of the components described above, such as input devices 110, graphics adapters 112, and displays 118.

The functionality or operations described herein and with respect to FIGS. 2-21 may be performed partially or wholly on a processor, such as the one described above with regards to the computing system 100.

Some of the devices shown in FIG. 1 include a computing system. The computing system can include a processor (CPU) and a system bus that can couple various system components including a system memory such as read only memory (ROM) and random-access memory (RAM), to the processor. The aspects disclosed herein may be suitably implemented on conventional computing devices, for example, computer workstations, on Internet-based applications, on optical computing devices, neural computers, biological computers, molecular computing devices, and other devices. As may be appreciated by those skilled in the art, the aspects disclosed herein may be implemented on any system, automaton, or automated machine.

The computing system 100 may act as a server. The computing system 100 may be clustered with other computing systems 100 to create the server or a network of computing systems 100. The various computing systems 100 that constitute the server may communicate with each other over a network. As can be appreciated by one of ordinary skill in the art, the embodiments disclosed herein may be implemented on any suitable system, network architecture, configuration, device, machine, or apparatus, and is not construed as being limited to any specific configuration, network, systems, even though an example system is shown and described with respect to FIG. 1.

The examples herein may be suitably implemented on conventional computing devices, for example, computer workstations, on Internet-based applications, on optical computing devices, neural computers, biological computers, molecular computing devices, and other devices. As may be appreciated by those skilled in the art, the operations described herein may be implemented on any system, automaton, Von Neumann machine, Turing-complete method such as functional programming or other method based on lambda calculus, or Turing machine or Turing machine equivalent. An automaton is herein described as a mechanism that is relatively self-operating and designed to follow a predetermined sequence of operations or respond to encoded instructions. A Von Neumann machine is herein described as an architecture for constructing computing devices. A Turing machine is herein described as an abstract expression of a computing device that may be realized or implemented on an infinite number of different physical computing devices.

Examples of systems, automatons or Turing machines that may be utilized in performing the process of the present invention include, but are not limited to: electrical computers (for example, an International Business Machines (IBM) personal computer); neuro-computers (for example, one similar to the "General Purpose Neural Computer" described in U.S. Pat. No. 5,155,802, issued to Paul H. Mueller, on Oct. 13, 1992); molecular computers (for example, one similar to the "Molecular Automata Utilizing Single or Double-Strand Oligonucleotides" described in U.S. Pat. No. 5,804,373, issued to Allan Lee Schweiter et al., on Sep. 8, 1998); biological computers (for example, one similar to the biological computer presented by Ehud Shapiro, of the Computer Science and Applied Mathematics Department at the Weizman Institute of Science (Rehovot, Israel), at the Fifth International Meeting on DNA-Based Computers); quantum computers (for example, one similar to the "Method and apparatus for quantum information processing", described in U.S. Pat. No. 5,917,322, issued to Neil Gershenfeld et al. on Jun. 29, 1999); and optical computers.

The examples disclosed herein may be applied to devices such as neurosynaptic computers, application-specific computers (or application specific integrated circuits, sometimes referred to as ASICs), software-defined hardware, domain-specific systems on a chip, processors devoted specifically to artificial intelligence-related tasks, or any computer, processor or chip with a special architecture.

The systems described above may provide multiple ones of any or each of those components and these components may be provided on either a standalone machine or, in some embodiments, on multiple machines in a distributed system. In addition, the systems and operations described above may be provided as one or more computer-readable programs embodied on or in one or more articles of manufacture.

The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, DRAMs, DIMMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a server providing access to the computer-readable programs via a network transmission line, wireless transmission media, signals propagating through space, radio waves, infrared signals, quantum signals, etc. The article of manufacture may be a memory card, magnetic tape, or any other device for storing information. The article of manufacture includes hardware logic as well as software or programmable code embedded in a computer readable medium that is executed by a processor.

In general, the computer-readable programs may be implemented in any suitable programming language, such as LISP, PERL, C, C++, C#, PROLOG, Clojure, Python, Perl, Swift, PHP, Javascript, SQL, any variation of SQL, SparQL, Neo4J, any RDF query language, QCL (Quantum Computer Language) or in any byte code language such as Java, or in any form of evolutionary programming such as genetic algorithms or genetic programs, or in any bio-programming language such as those for programming DNA. The software programs may be stored on or in one or more articles of manufacture as source code or as object code. Various physical systems such as the computing system 100 may be used as described herein to perform various operations such as the operations described herein.

The computing system may include more than one processor, or a group or cluster of computing systems networked together to provide greater processing capability. The system bus may be any of several types of bus structures including a memory bus or memory controller, a peripheral bus, and a local bus using any of a variety of bus architectures. A basic input/output system (BIOS) stored in the ROM or the like may provide basic routines that help to transfer information between elements within the computing system, such as during start-up.

The computing system 100 can additionally include data stores, which maintain a database according to known database management systems (DBMS). The data stores may include a hard disk drive, a magnetic disk drive, an optical disk drive, or another type of computer readable media which can store data that are accessible by the processor, such as magnetic cassettes, flash memory cards, digital versatile disks, cartridges, random access memory (RAM) and read only memory (ROM). The data stores may be connected to the computing system bus by a drive interface and the data stores provide nonvolatile storage of computer readable instructions, data structures, program modules and other data for the computing system.

To enable human (and in some instances, machine) user interaction, the computing system may include an input device 110, such as a microphone for speech and audio, a touch sensitive screen for gesture or graphical input, keyboard, mouse, motion input, motion detection, camera for video and photo input, virtual reality gloves, controllers, thumb rings, wands, move controllers, touch controllers, knuckle controllers, glasses with eye controllers, and the like. In some instances, multimodal systems enable a user to provide multiple types of input to communicate with the computing system.

An output device, such as the display 118, can include one or more of a number of output mechanisms, such as a display screen, a printer, a speaker, a heads-up display, an augmented reality display, a virtual reality headset, or any other output or display mechanism. A communications interface generally enables the computing device system to communicate with one or more other computing devices using various communication and network protocols.

Examples disclosed herein can be implemented in digital electronic circuitry, or in computer software, firmware, or hardware, including the herein disclosed structures and their equivalents. Some examples can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices.

As used herein, the term processor can encompass various apparatuses, devices, and machines for processing data, including by way of example a programmable processor, a computer, a system on a chip, or multiple ones, or combinations, of the foregoing. The processor can include special purpose logic circuitry, e.g., a field programmable gate array (FPGA), or an application-specific integrated circuit (ASIC). The processor can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, function, procedure, algorithm, method, or code) can be written in any form of programming language, including compiled or interpretive languages, declarative, procedural, or functional languages, and the program can be deployed in any form, including as a stand-alone program or as a module, component, element, subroutine, object, method, or other unit suitable for use in a computing environment. A computer program may correspond to a file in a file system. A program can be stored in a portion of a file that includes other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a user interface. Such user interfaces may include interactive features such as pop-up or pull-down menus, lists, selection tabs, checkboxes, radio buttons, toggles, sliders, buttons, hyperlinks or other features or user interface widgets that can receive human inputs.

The computing system disclosed herein can include clients and servers. A client and server can generally be remote from each other and typically interact through a communications network. The relationship of client and server arises by virtue of computer programs running on the respective computers and having a client-server relationship to each other. In some examples, a server transmits data (e.g., an HTML page, data tagged by XML, JSON objects, etc.) to a client device (e.g., for purposes of displaying data to and receiving input from a user interacting with the client device). Data generated at the client device (e.g., as a result of user interaction) can be received from the client device at the server.

In an illustrative embodiment, any of the operations described herein can be implemented at least in part as computer-readable instructions stored on a computer-readable medium or memory. Upon execution of the computer-readable instructions by a processor, the computer-readable instructions can cause a computing system 100 to perform the operations.

The operations described herein and with respect to FIGS. 2-21 may be performed partially or wholly on, or otherwise using, the processor 102. For example, the processor 102 can execute one or more operations for generating and applying a training model 111 for training machine learning models for various machine learning functions related to property and property transfer. In some examples, the training model 111 can be or can include one or more AI models. The processor 102 can execute instructions stored in the memory 106 to perform the operations. The processor 102 can include one processing device or multiple processing devices or cores. Non-limiting examples of the processor 102 include a Field-Programmable Gate Array ("FPGA"), an application-specific integrated circuit ("ASIC"), a microprocessor, etc.

In some examples, the memory 106 can include computer program instructions for executing or applying the training model 111. For example, the instructions can include the training model 111 that is executable by the processor 102 for causing the processor 102 to output one or more evaluations or assessments of a potential list price of a property with respect to the quantitative values can include numeric scores or other types of quantitative information for indicating whether the list price is within a threshold range of a predicted sale price for the property. For example, the computing system 100 can output quantitative information, such as a percentage score or a percentile score indicating a likelihood that the property will sell for the potential list price.

Figure 2:
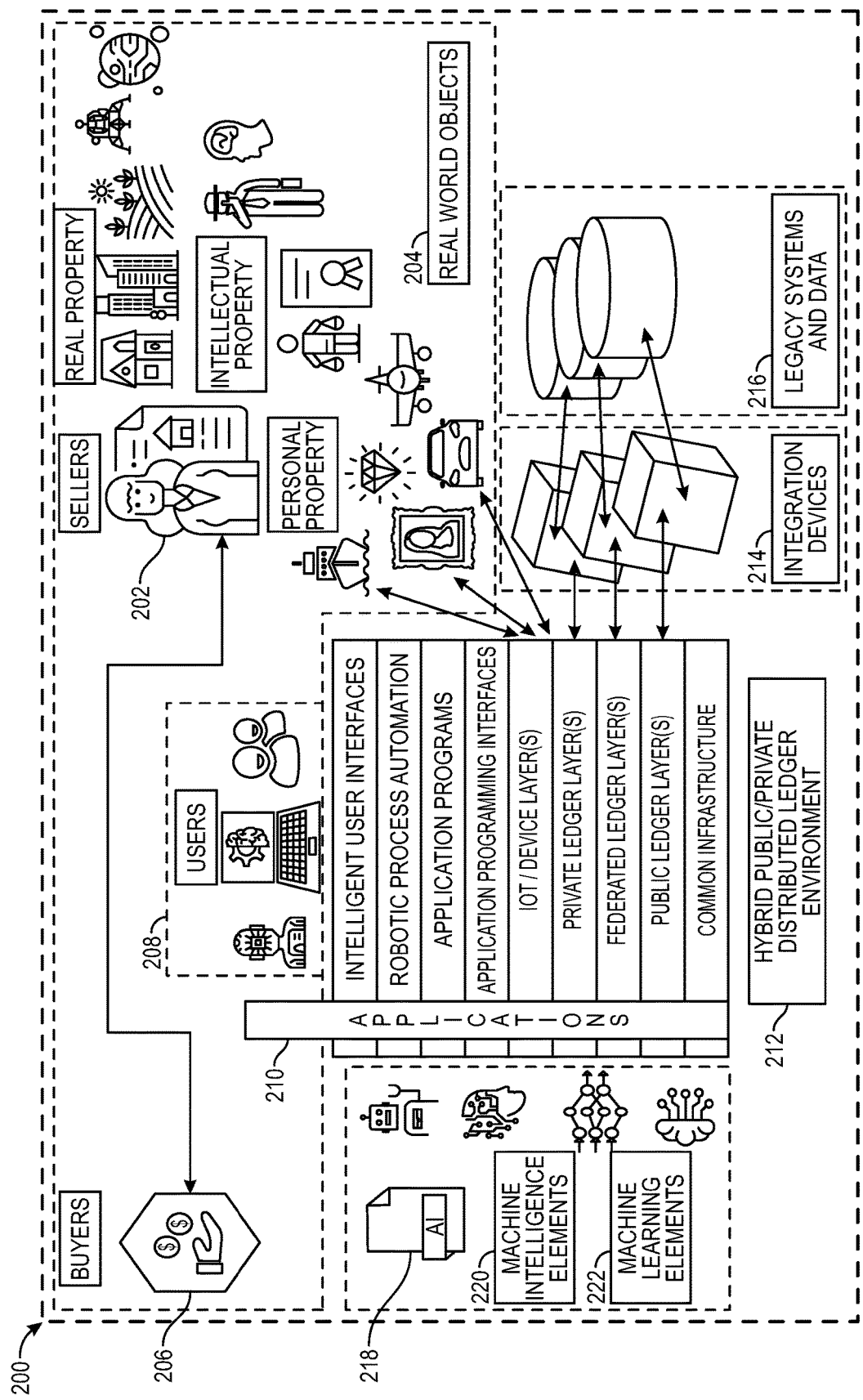
FIG. 2 is an illustrative diagram representing a high-level architectural view of the present disclosure in accordance with an illustrative embodiment.

FIG. 2 illustrates a high-level architectural view 200 of the present disclosure. In alternative embodiments, fewer, additional, and/or different elements, layers, and devices are included. As shown in FIG. 2, a hybrid distributed ledger environment 212 includes a private ledger layer, a federated ledger layer, and a public ledger layer. Additionally, the hybrid distributed ledger environment 212 may include an Internet of Things (IoT)/device layer. The IoT layer may be a system of interrelated computing devices, mechanical and digital machines, objects, animals or people that are provided with unique identifiers (UIDs) and have the ability to transfer data over a network without requiring human-to-human or human-to-computer interaction.

Buyers 206 and sellers 202 may interact by recording property transactions of real world objects 204 via the hybrid distributed ledger environment 212. Additionally, applications 210, artificial intelligence elements 218, and machine learning elements 220, 222 may interact with the hybrid distributed ledger environment 212 to facilitate the recordation and/or transfer of property. Applications programming interfaces (APIs), application programs, robotic process automation, and intelligent user interfaces may also be utilizing with the hybrid distributed ledger environment 212 to facilitate the recordation and/or transfer of property. Robotic Process Automation (RPA) is technology allowing the configuration of computer software as a "robot" to emulate and integrate the actions of a human interacting within digital systems to execute a business process. Intelligent user interfaces (Intelligent UI, IUI or sometimes Interface Agents) are user interfaces (UI) that involves some aspect of artificial intelligence (AI or computational intelligence) and which allow the interface to better understand a user's needs and personalize or guide the interaction.

The artificial intelligence elements 218 may include natural language capabilities for receiving voice commands related to property transfer. The artificial intelligence elements 218 may also search several sources of information on a property to identify all of the relevant information for the property such as encumbrances on the property and aggregate the results. Still further, the artificial intelligence elements 218 may recognize patterns in general or specific types of properties to perform a predictive analysis and predict future outcomes.

The machine learning elements 220, 222 may recognize patterns in general or specific types of properties, such as transfer/sale patterns, price patterns, ownership patterns, etc. Furthermore, the machine learning elements 220, 222 may classify events, user interactions, etc., and recognize deviations from patterns to identify a likelihood of fraud.

The artificial intelligence elements 218 and machine learning elements 220, 220 may analyze the property information from the hybrid distributed ledger environment 212 to provide reports to users, to generate contracts, title transfers, etc., to predict and recommend a price for listing a property, etc.

Integration devices 214 and legacy systems 216 may also interact with the hybrid distributed ledger environment 212 to provide identification information, ownership information, transaction-related documents and/or any other suitable information for properties. Integration devices 214 may refer middleware used to transform, route, clone and translate data between multiple systems.

The hybrid distributed ledger environment 212 records any suitable information related to property. The property information may include minting a token (e.g., an NFT) representing the property, where the token acts as a digital deed or certificate of ownership of the property.

In addition to minting an NFT representing the property, the property recordation system may communicate with a third-party certificate authority to generate a certificate of authenticity for the owner of the property. The certificate may include a description of the property, such as a name of the property, a location of the property, a unique identification number for the property, etc., and identification information for the owner of the property, such as a name of the person or organization that currently owns the property, an address of the current owner, a phone number of the current owner, etc. The certificate may also include distributed ledger information for the property, such as a reference to the NFT representing the property (e.g., a token ID and/or smart contract address for the NFT).

In some implementations, the machine learning elements 220, 222 may recognize and classify digital certificates of authenticity as either from a valid, "accredited" authenticator (e.g., Verisart for physical art, PSA for sports trading cards, etc.) or may reject a digital certificate of authenticity if it is not from a valid "accredited" authenticator. The machine learning elements 220, 222 may identify acceptable, valid patterns in certificates of authenticity from the accredited providers.

As mentioned above, the property may be real property, personal property, intellectual property, or any suitable type of property. The property information may include identification information for the property, such as a name of the property, a location of the property, a unique identification number for the property, etc. The property information may also include ownership information for the property, such as a name of the person or organization that currently owns the property, an address of the current owner, a phone number of the current owner, and/or any other suitable identification information for the current owner. The ownership information may also include identification information for each of the previous owners of the property, dates on which the property was transferred, etc. Still further, the property information may include title information for the property, encumbrances on the property, documents related to the title, encumbrances, transfers of ownership, etc., such as deeds, contracts related to the sale of the property, mortgages and/or liens on the property, leases on the property, etc.

An encumbrance on a property may be a right to, interest in, or legal liability on property that does not prohibit passing title to the property but that may diminish its value. Encumbrances can be classified in several ways, such as financial (e.g., liens) or non-financial (e.g., easements, private restrictions), and alternatively, may be divided into those that affect title (e.g., lien, legal or equitable charge) or those that affect the use or physical condition of the encumbered property (e.g., restrictions, easements, encroachments), and types of encumbrances include security interests, liens, servitudes (e.g., easements, wayleaves, real covenants, profits a prendre), leases, restrictions, encroachments, and air and subsurface rights. Those considered as potentially making the title defeasible are encumbrances, for example, charging orders, building orders and structure alteration.

In some implementations, a user may mint an NFT representing the property on the public ledger layer, where the NFT includes identification information for the property. The user may then wrap the NFT in a smart contract on the federated ledger layer and create a wrapped NFT for the property on the federated ledger layer to transfer the wrapped NFT to the user as the owner of the property to reflect the ownership information for the property. Then when the user sells the property to another owner, the user may transfer the wrapped NFT to the other owner on the federated ledger layer while the corresponding NFT in the public ledger layer remains static and immutable. Still further, the user may wrap the NFT in a smart contract on the private ledger layer and create a wrapped NFT for the property on the private ledger layer to include each of the transaction-related documents for the property. When a new transaction-related document is created for the property (e.g., a new sales contract) or a transaction-related document is modified, the validating nodes on the private ledger layer may associate the new or modified transaction-related document with the wrapped NFT on the private ledger layer while the corresponding NFT in the public ledger layer remains static and immutable. In this manner, each of the ledger layers may reference each other through the NFT and wrapped NFTs referring to the NFT while recording different types of information related to the property.

Figure 3:
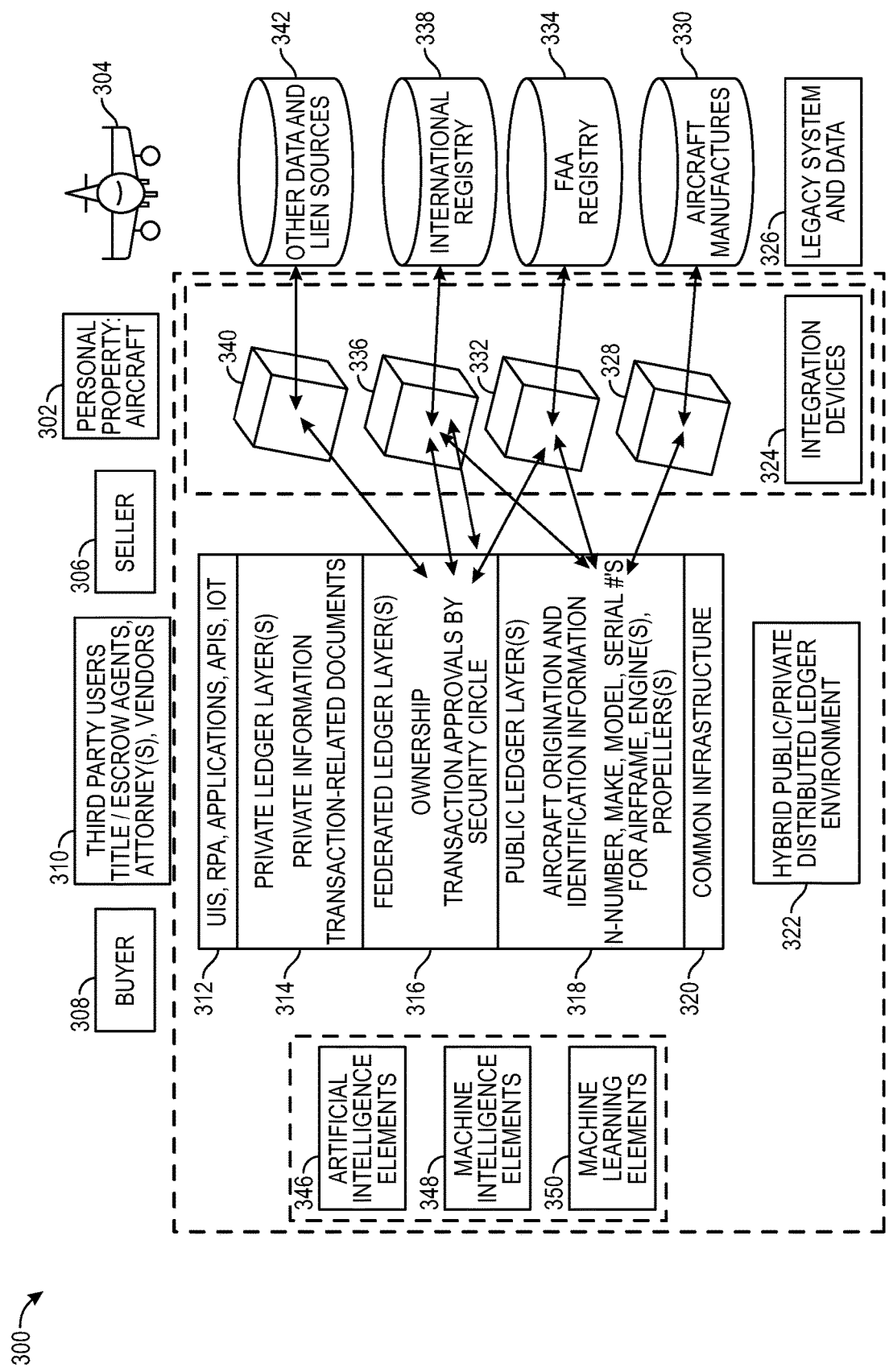
FIG. 3 is a block diagram representing one implementation of the techniques of this disclosure applied to personal property, in particular, to the aircraft.

As mentioned above, the hybrid distributed ledger environment 212 may record and manage property transactions for several types of property. FIG. 3 illustrates an example implementation 300 of the hybrid distributed ledger environment 212 applied to personal property, in particular, to an aircraft. As shown in FIG. 3, the public ledger layer may include identification information for each aircraft, such as aircraft origination and identification information, an N-number, a make, a model, or serial number for an airframe, propeller, or engine of the aircraft, etc. The federated ledger layer may include ownership information for the aircraft, such as the name, address, phone number, unique identification number, etc., of a person or organization that owns the aircraft, and/or identification information for each previous owner of the aircraft. In some implementations, the public ledger layer may additionally or alternatively include ownership information. The private ledger layer may include transaction-related documents, such as the title to the aircraft, contracts signed by each party, documents describing encumbrances on the property, etc. The public, federated, and/or private ledger layers may obtain the identification information, the ownership information, and/or transaction-related documents from an international registry 338, an FAA registry 334, aircraft manufacturers 330, legacy recording systems 326, and/or other data or lien sources 342.

Figure 4:
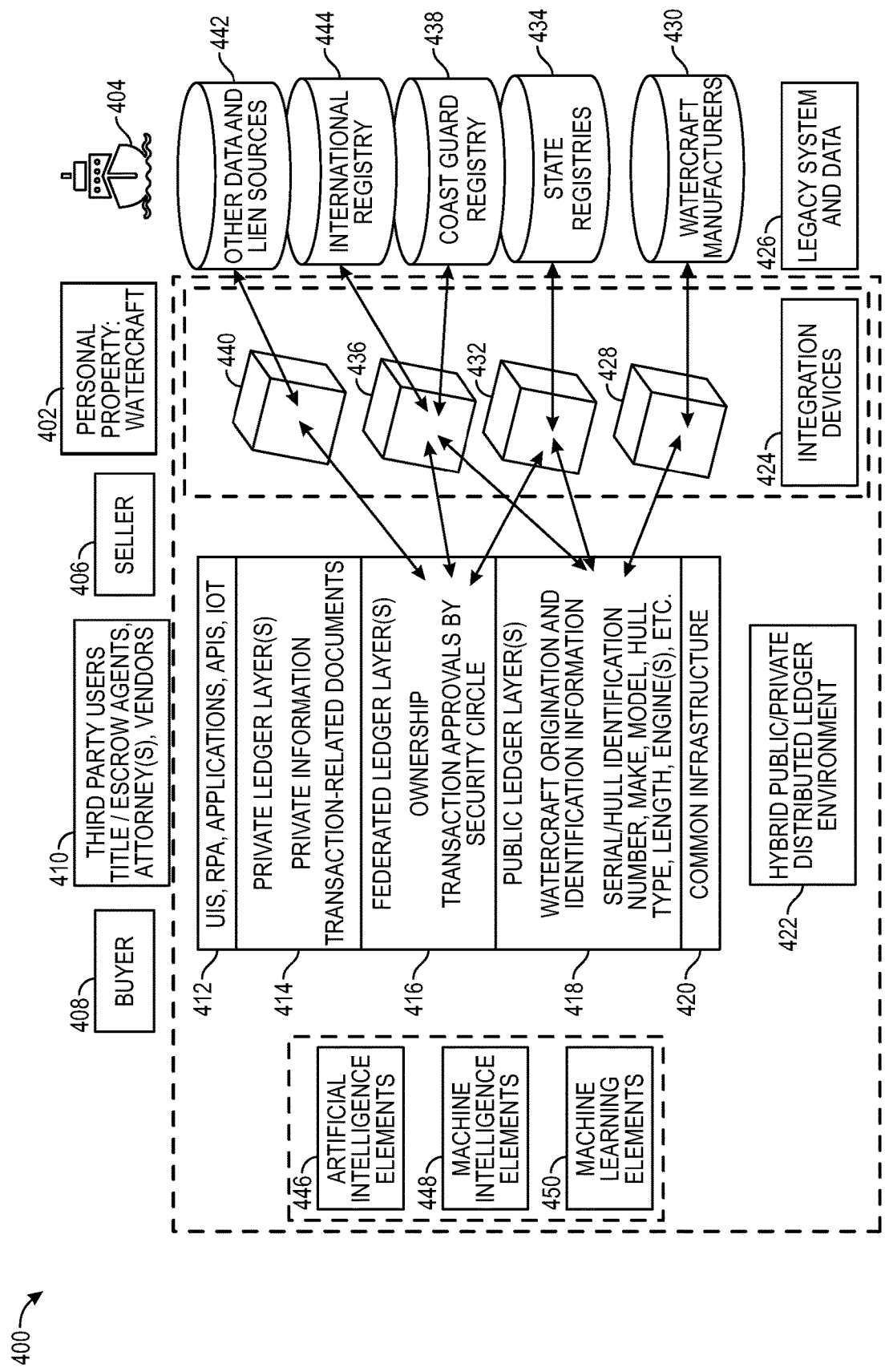
FIG. 4 is a block diagram representing another implementation of the techniques of this disclosure applied to personal property, in particular, to the watercraft//vessels/boats.

FIG. 4 illustrates an example implementation 400 of the hybrid distributed ledger environment 212 applied to personal property, in particular, to watercraft/vessels/boats. As shown in FIG. 4, the public ledger layer may include identification information for each watercraft, such as watercraft origination and identification information, a hull identification number, a make, model, or year of the watercraft, a body type, a hull material, a shipping weight, an engine number, a propulsion type, a length, a number of cylinders, a name of a distributer or dealer, etc. The federated ledger layer may include ownership information for the watercraft, such as the name, address, phone number, unique identification number, etc., of a person or organization that owns the watercraft, and/or identification information for each previous owner of the watercraft. In some implementations, the public ledger layer may additionally or alternatively include ownership information. The private ledger layer may include transaction-related documents, such as the title to the watercraft, contracts signed by each party, documents describing encumbrances on the property, etc. The public, federated, and/or private ledger layers may obtain the identification information, the ownership information, and/or transaction-related documents from an international registry 444, a coast guard registry 438, a state registry 434, a watercraft manufacturer 430, legacy recording systems 426, and/or other data or lien sources 442.

Figure 5:
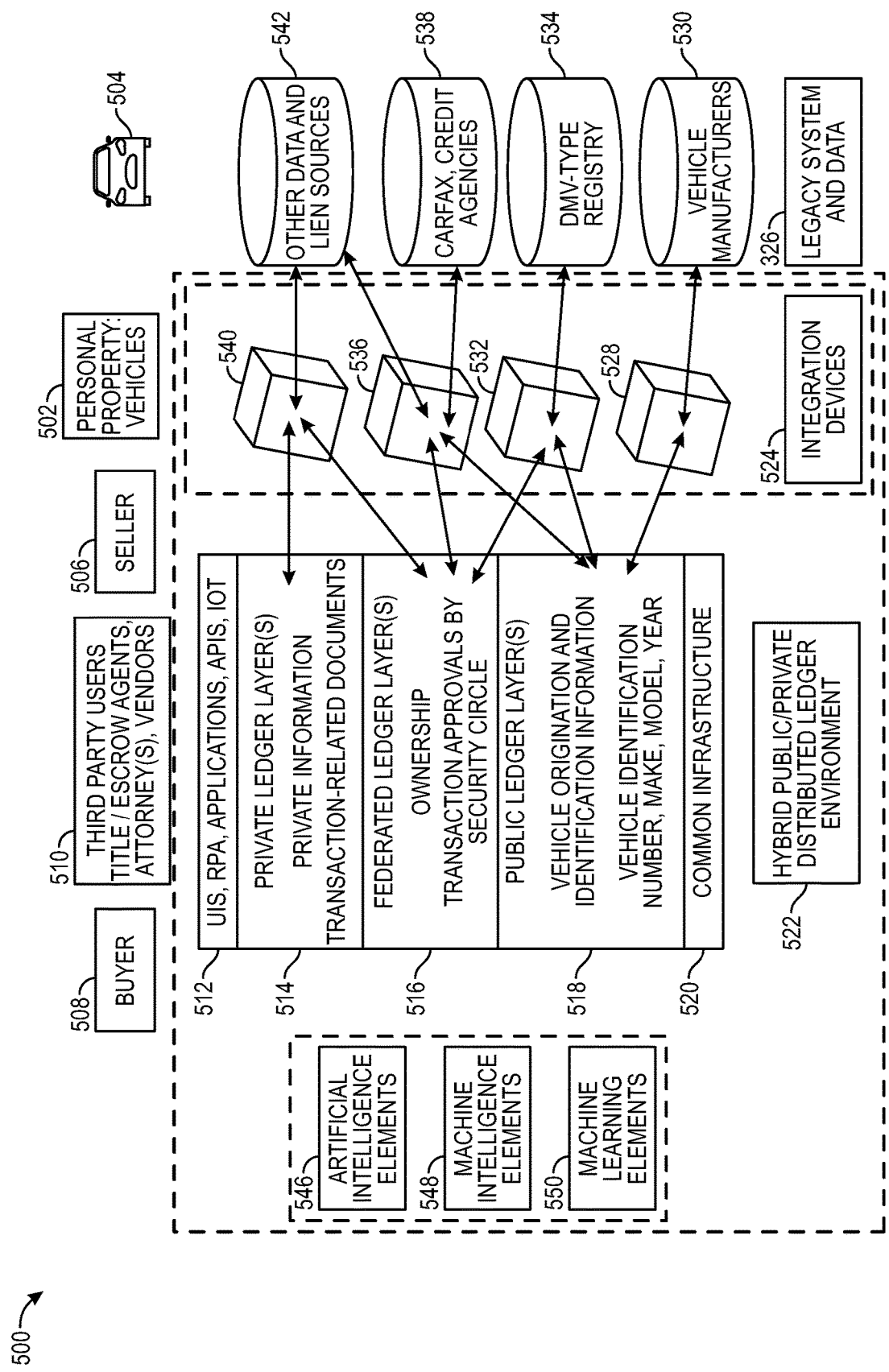
FIG. 5 is a block diagram representing yet another implementation of the techniques of this disclosure applied to personal property, in particular, to the vehicles.

FIG. 5 illustrates an example implementation 500 of the hybrid distributed ledger environment 212 applied to personal property, in particular, to vehicles. As shown in FIG. 5, the public ledger layer may include identification information for each vehicle, such as vehicle origination and identification information, a certificate of origin of the vehicle, a vehicle identification number, a make, a model, a year, a body type, a shipping weight, a series, a number of cylinders, or a name of a distributer or dealer, etc. The federated ledger layer may include ownership information for the vehicle, such as the name, address, phone number, unique identification number, etc., of a person or organization that owns the vehicle, and/or identification information for each previous owner of the vehicle. In some implementations, the public ledger layer may additionally or alternatively include ownership information. The private ledger layer may include transaction-related documents, such as the title to the vehicle, contracts signed by each party, documents describing encumbrances on the property, etc. The public, federated, and/or private ledger layers may obtain the identification information, the ownership information, and/or transaction-related documents from a credit agency 538, a department of motor vehicles registry 534, a watercraft manufacturer 530, legacy recording systems 526, and/or other data or lien sources 542.

Figure 6:
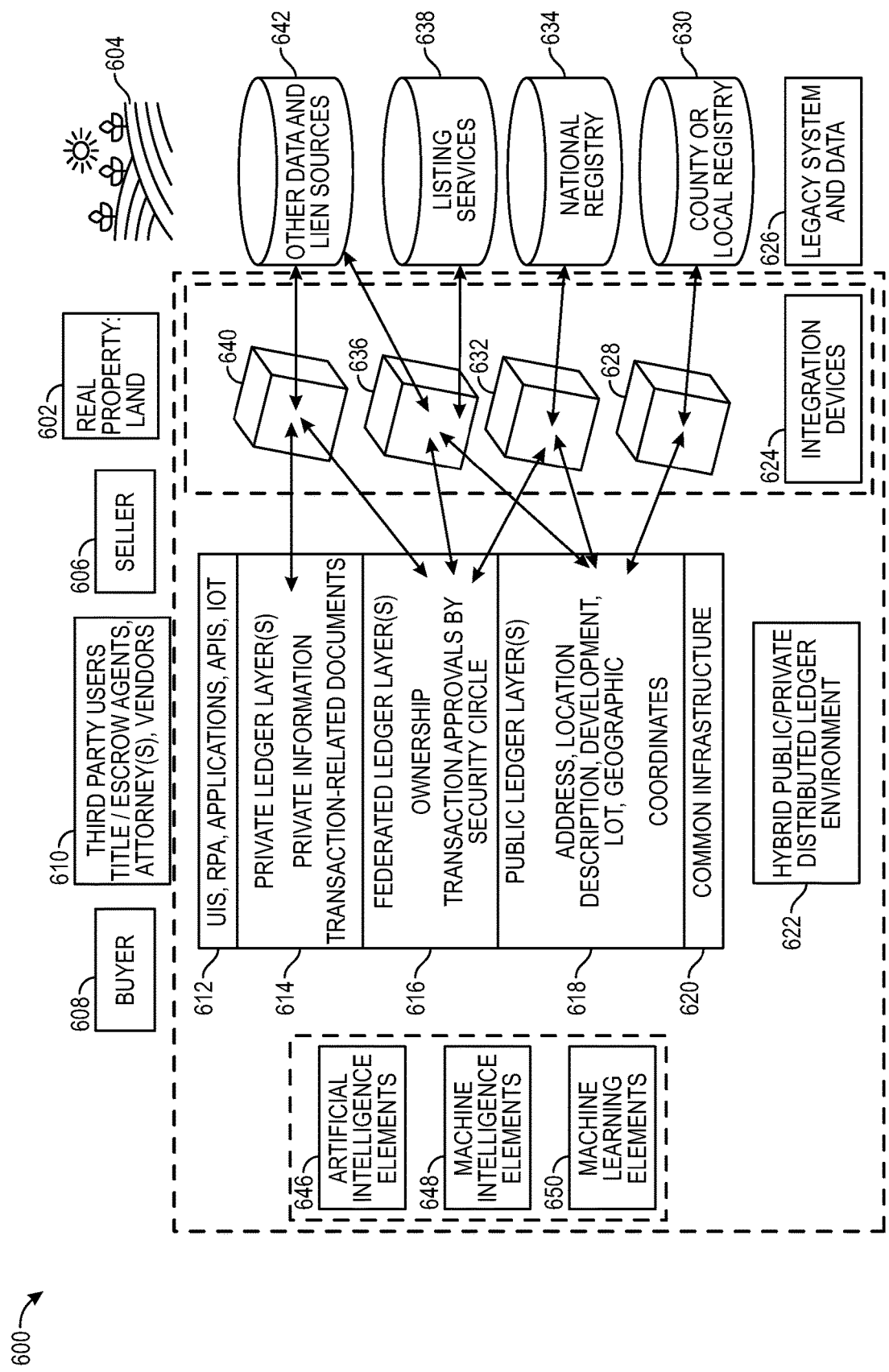
FIG. 6 is a block diagram representing another implementation of the techniques of this disclosure applied to real property, in particular, to land.

FIG. 6 illustrates an example implementation 600 of the hybrid distributed ledger environment 212 applied to real property, in particular, to land. As shown in FIG. 6, the public ledger layer may include identification information for each plot of land, such as an address, a description of a location of the plot of land, a development, a lot number, geographic coordinates for the plot land, etc. The federated ledger layer may include ownership information for the plot of land, such as the name, address, phone number, unique identification number, etc., of a person or organization that owns the plot of land, and/or identification information for each previous owner of the plot of land. In some implementations, the public ledger layer may additionally or alternatively include ownership information. The private ledger layer may include transaction-related documents, such as the title to the plot of land, contracts signed by each party, documents describing encumbrances on the plot of land, etc. The public, federated, and/or private ledger layers may obtain the identification information, the ownership information, and/or transaction-related documents from listing services 638, a national registry 634, a county or local registry 630, legacy recording systems 626, and/or other data or lien sources 642.

Figure 7:
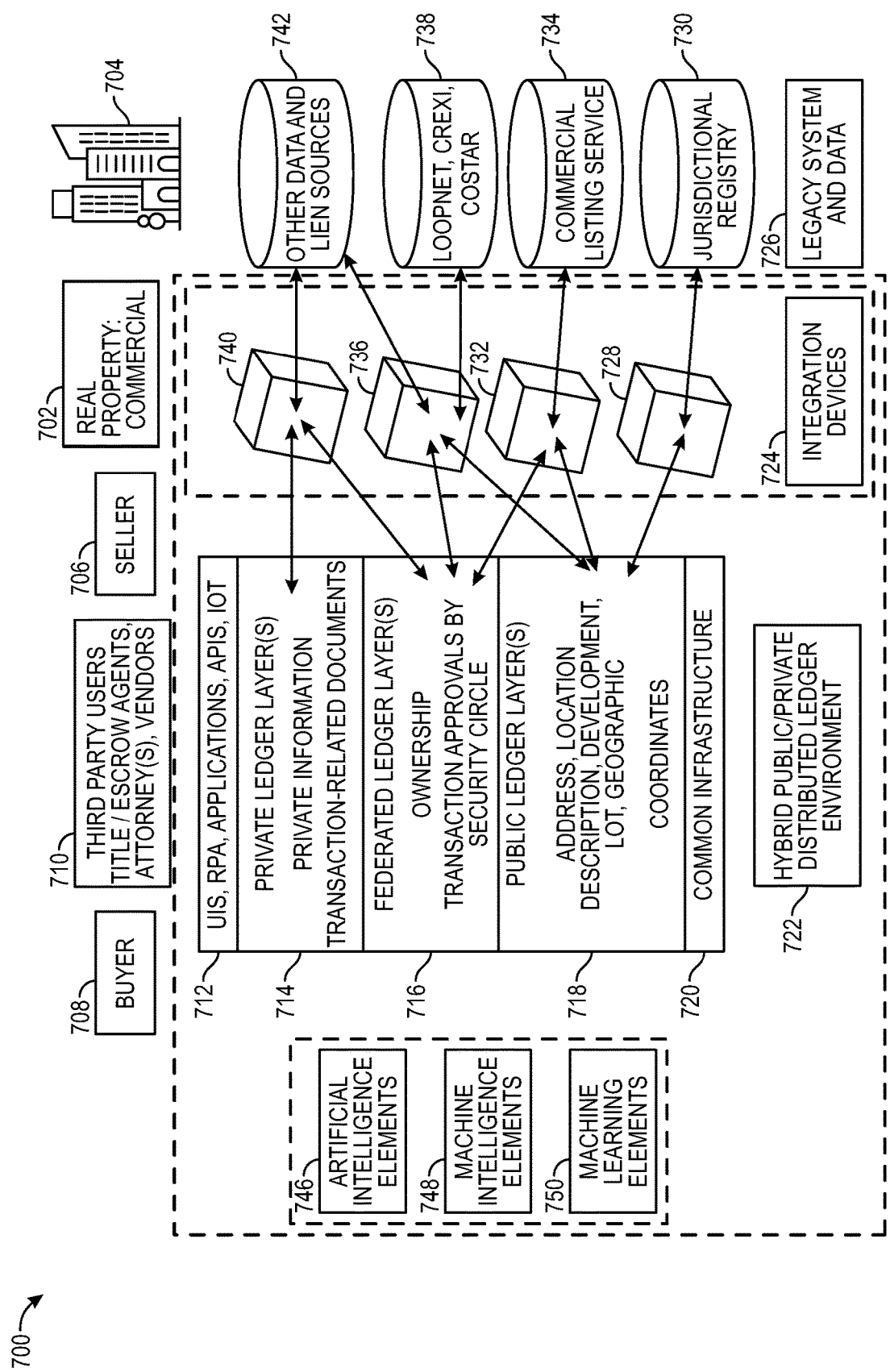
FIG. 7 is a block diagram representing yet another implementation of the techniques of this disclosure applied to real property, in particular, to commercial real estate.

FIG. 7 illustrates an example implementation 700 of the hybrid distributed ledger environment 212 applied to real property, in particular, to commercial real estate. As shown in FIG. 7, the public ledger layer may include identification information for each commercial property, such as an address, a description of a location of the commercial property, a development, a lot number, geographic coordinates for the commercial property, etc. The federated ledger layer may include ownership information for the commercial property, such as the name, address, phone number, unique identification number, etc., of a person or organization that owns the commercial property, and/or identification information for each previous owner of the commercial property. In some implementations, the public ledger layer may additionally or alternatively include ownership information. The private ledger layer may include transaction-related documents, such as the title to the commercial property, contracts signed by each party, documents describing encumbrances on the commercial property, etc. The public, federated, and/or private ledger layers may obtain the identification information, the ownership information, and/or transaction-related documents from Loopnet, Crexi, Costar, etc. 738, a commercial listing service 734, a jurisdictional registry 730, legacy recording systems 726, and/or other data or lien sources 742.

Figure 8:
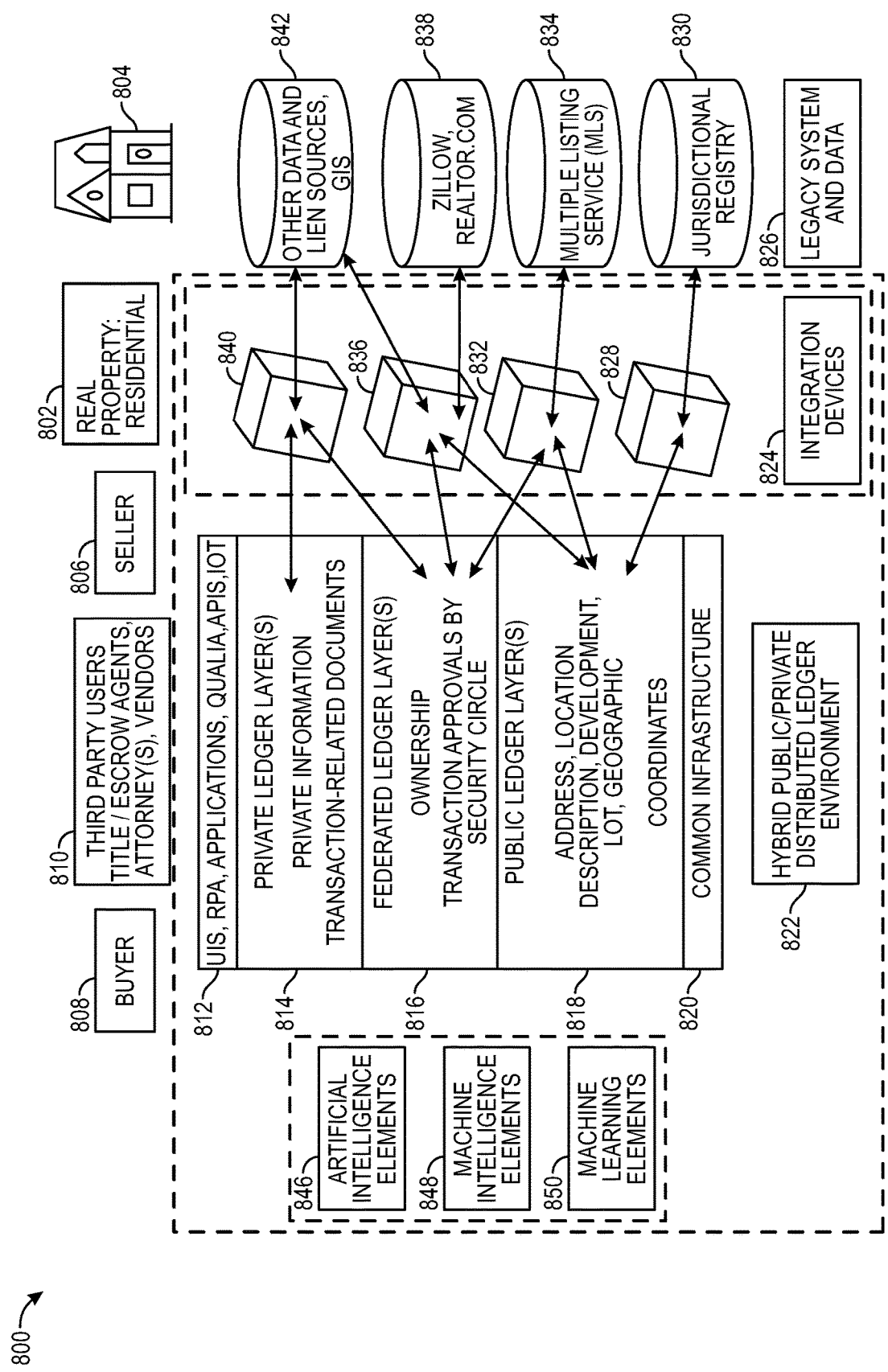
FIG. 8 is a block diagram representing another implementation of the techniques of this disclosure applied to real property, in particular, to residential real estate.

FIG. 8 illustrates an example implementation 800 of the hybrid distributed ledger environment 212 applied to real property, in particular, to residential real estate. As shown in FIG. 8, the public ledger layer may include identification information for each residential property, such as an address, a description of a location of the residential property, a development, a lot number, geographic coordinates for the residential property etc. The federated ledger layer may include ownership information for the residential property, such as the name, address, phone number, unique identification number, etc., of a person or organization that owns the residential property, and/or identification information for each previous owner of the residential property. In some implementations, the public ledger layer may additionally or alternatively include ownership information. The private ledger layer may include transaction-related documents, such as the title to the residential property, contracts signed by each party, documents describing encumbrances on the residential property, etc. The public, federated, and/or private ledger layers may obtain the identification information, the ownership information, and/or transaction-related documents from Zillow, Redfin, Realtor.com, etc. 838, a multiple listing service (MLS) 834, a jurisdictional registry 830, legacy recording systems 826, and/or other data or lien sources 842.

Figure 9:
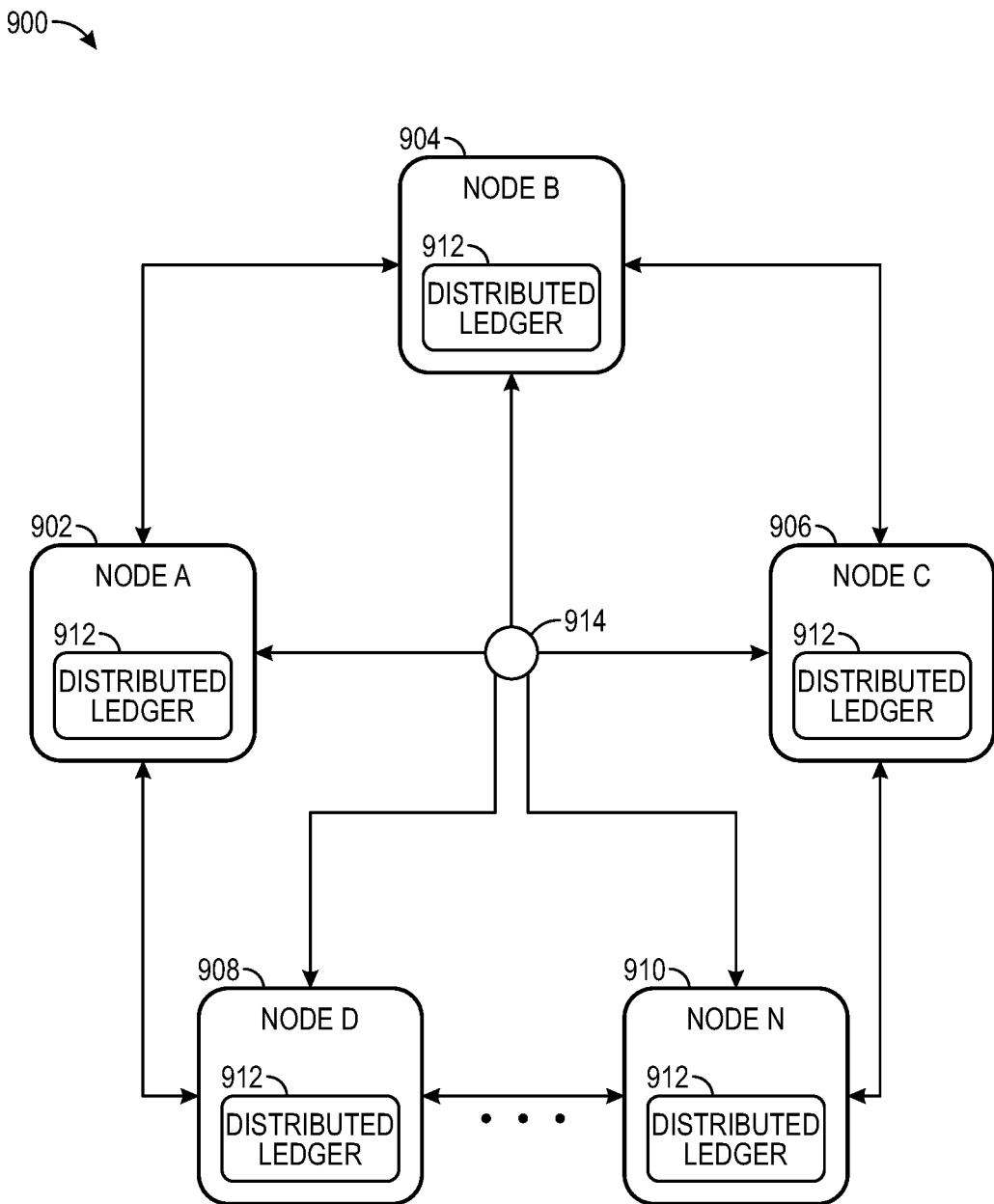
FIG. 9 is an exemplary distributed ledger system for recording transactions and executing smart contracts in a property recordation system.

FIG. 9 depicts an exemplary distributed ledger system 900 for recording property information. The system 900 includes a distributed ledger 912 (e.g., having one or more distributed ledger layers) and a plurality of nodes 902, 904, 906, 908, and 910. Each node maintains a copy of the distributed ledger 912. As changes are made to the distributed ledger 912, each node receives the change via the network 914 and updates its respective copy of the distributed ledger 912. A consensus mechanism may be used by the nodes 902-910 in the distributed ledger system 900 to decide whether it is appropriate to make received changes to the distributed ledger 912 or to a particular layer of the distributed ledger 912. For example, the consensus mechanism may be the Stellar Consensus Protocol (SCP), a variant of Practical Byzantine Fault Tolerance (PBFT) proposed by Mazieres called Federated Byzantine Fault Tolerance (FBFT) where nodes 902, 904, 906, 908, and 910 belonging to intersecting groups (i.e., the federates) run a local consensus protocol among their members, providing a method that is decentralized and open to the public and which allows every federate to participate in the consensus protocol with very low transaction latency (on the order of a few seconds).

Each node in the system therefore has its own copy of the distributed ledger 912, which is identical to every other copy of the distributed ledger 912 stored by the other nodes. The distributed ledger system 900 may be more robust than a central authority database system because of the distributed ledger's decentralized nature. As such, there is no single point of failure on the distributed ledger system 900 as there would be in a centralized system.

Figure 10:
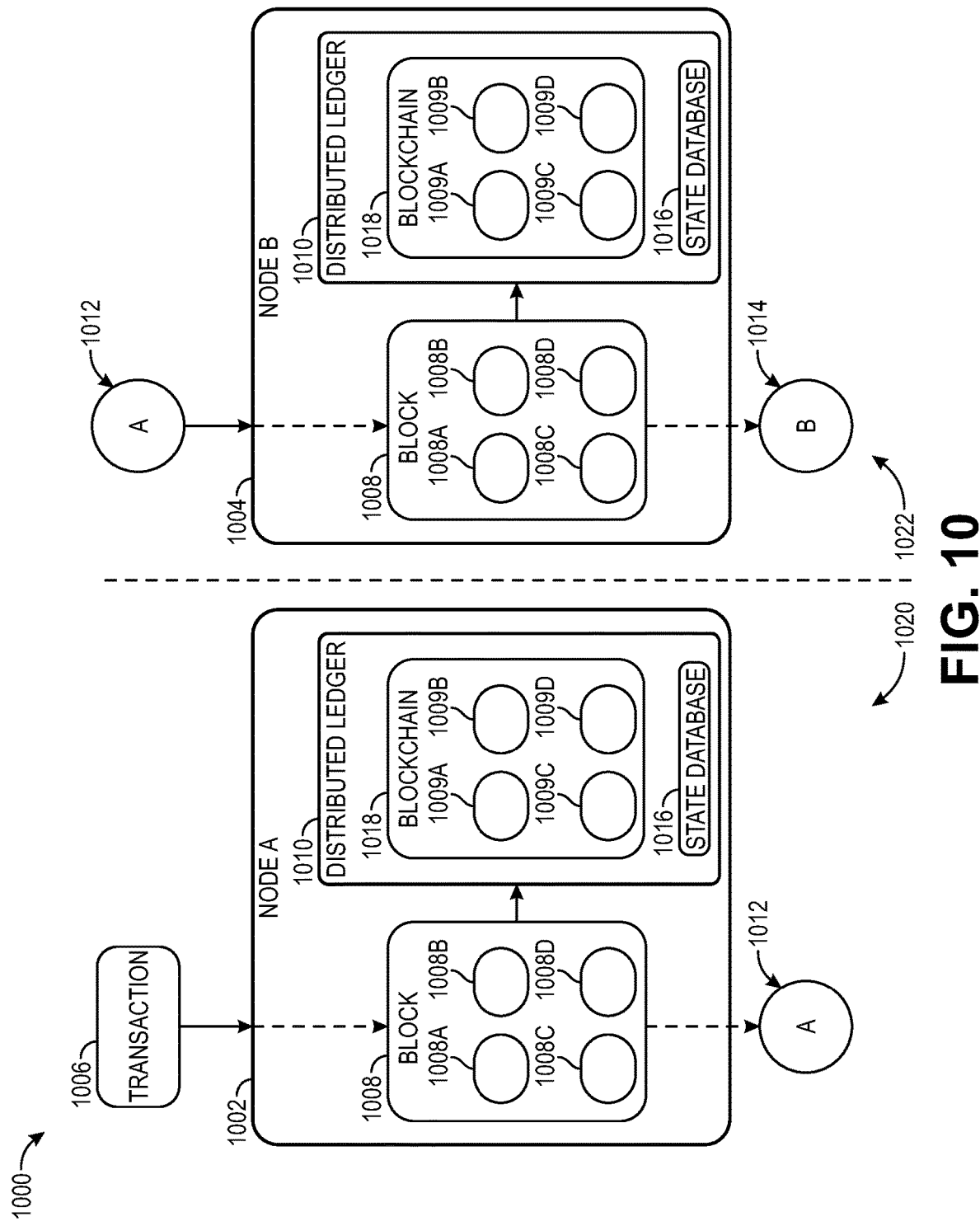
FIG. 10 illustrates exemplary validating network nodes and an exemplary transaction flow on a distributed ledger network in a property recordation system.

FIG. 10 depicts exemplary validating network nodes and an exemplary transaction flow 1000 on a distributed ledger network for resolving transactions. FIG. 10 includes two time frames 1020 and 1022 represented by the left and right sides of the dotted line, respectively, Node A 1002 and Node B 1004 (which may be part of the same distributed ledger network for the same layer, such as the private layer, the public layer, the federated layer, etc.), a set of transactions 1008A-1008D, a set of blocks of transactions 1009A-1009D, a distributed ledger 1010, and a blockchain 1018.

The block propagation flow 400 may begin with Node A 1002 receiving transaction 1006 at time 1020. When Node A 1002 confirms that transaction 1006 is valid, Node A 1002 may add the transaction to a newly generated block 1008. As part of adding the transaction 1006 to block 1008, Node A 1002 may solve a cryptographic puzzle and include the solution in the newly generated block 1008 as proof of the work done to generate the block 1008. Alternatively, a proof of stake algorithm may be used to generate the block 1008, whereby Node A 1002 "stakes" an amount of a digital token used on the network, however, the network itself determines the node that will mint the new block. In another implementation, a proof of authority (PoA) algorithm may be used to generated the block 1008, where transactions and blocks are validated by approved accounts, known as validators which run software allowing them to record transactions in the distributed ledger.

In other embodiments, the transaction 1006 may be added to a pool of transactions until a sufficient number of transactions in the pool exist to form a block or distributed ledger entry. Node A 1002 may transmit the newly created distributed ledger entry 1008 to the network at time 1012. Before or after propagating the distributed ledger entry 1008, Node A 1002 may add the distributed ledger entry 1008 to its copy of the distributed ledger 1018.

While proof of work and proof of stake are described herein as consensus algorithms for selecting a node to mint a new distributed ledger entry, these are merely a few example consensus algorithms and are not intended to be limiting. Additional consensus algorithms may be utilized, such as delegated proof of stake where nodes elect a subset of nodes referred to as delegates to perform validation, and the delegates take turns minting new distributed ledger entries. Consensus algorithms may also include proof of authority, proof of weight, Byzantine fault tolerance, such as practical and federated Byzantine fault tolerance, tangle consensus algorithms, block lattice consensus algorithms, etc. Additionally, quorum slices may be selected where a quorum is a set of nodes that participate in the consensus protocol and a quorum slice is its subset that helps a node in its agreement process. Individual trust decisions may be made by participants in the distributed ledger network to construct a quorum slice. Still further, security circles may be identified which are closed groups of network participants who together can form a quorum to reach a consensus on a transaction and to make further trust decisions.

In any event, the transactions 1009A-1009D may include updates to a state database 1016. The state database 1016 may contain current values of variables created by smart contracts deployed on the distributed ledger 1018. Validated distributed ledger entries, such as distributed ledger entry 1008, may include transactions effecting state variables in state database 1016. At time 1022, Node B 1004 may receive the newly created distributed ledger entry 1008 via the network at 1012. Node B 1004 may verify that the distributed ledger entry 1008 is valid by checking the solution to the cryptographic puzzle provided in the distributed ledger entry 1008. If the solution is accurate, then Node B 1004 may add the distributed ledger entry 1008 to its distributed ledger 1018 and make any updates to the state database 1016 as rejected by the transactions in distributed ledger entry 1008. Node B 1004 may then transmit the distributed ledger entry 1008 to the rest of the network at time 1014.

Figure 11:
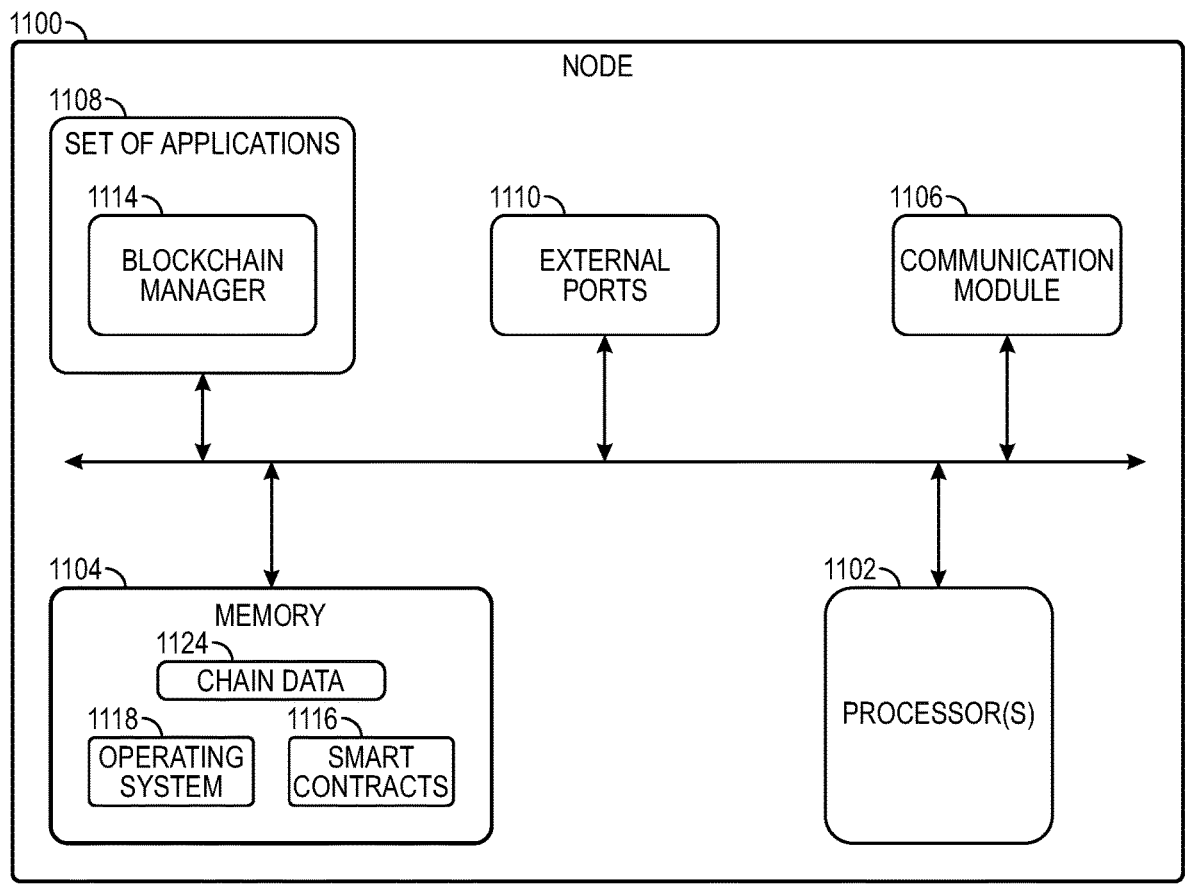
FIG. 11 illustrates exemplary components of a network node on a distributed ledger network in a process control system.

FIG. 11 depicts exemplary components of a validating network node 1100 on a distributed ledger network for recording property information. Node 1100 may include at least one processor 1102, memory 1104, a communication module 1106, a set of applications 1108, external ports 1110, a blockchain manager 1114, smart contracts 1116, and an operating system 1118. In some embodiments, the node 1100 may generate a new block of transactions, or may broadcast transactions to other network nodes by using the blockchain manager 1114. Similarly, the node 1100 may use the blockchain manager 1114 in conjunction with the smart contracts 1116 stored in the memory 1104 to execute the functionality disclosed herein. The memory 1104 may further include chain data 1124 including, for example, a state database of the blockchain for storing states of smart contracts deployed thereon.

In other embodiments, the smart contracts 1116 operate independent of the blockchain manager 1114 or other applications. In some embodiments, the node 1100 does not have a blockchain manager 1114, or smart contracts 1116 stored at the node. In some embodiments, the node 1100 may have additional or fewer components than described.

Figure 12:
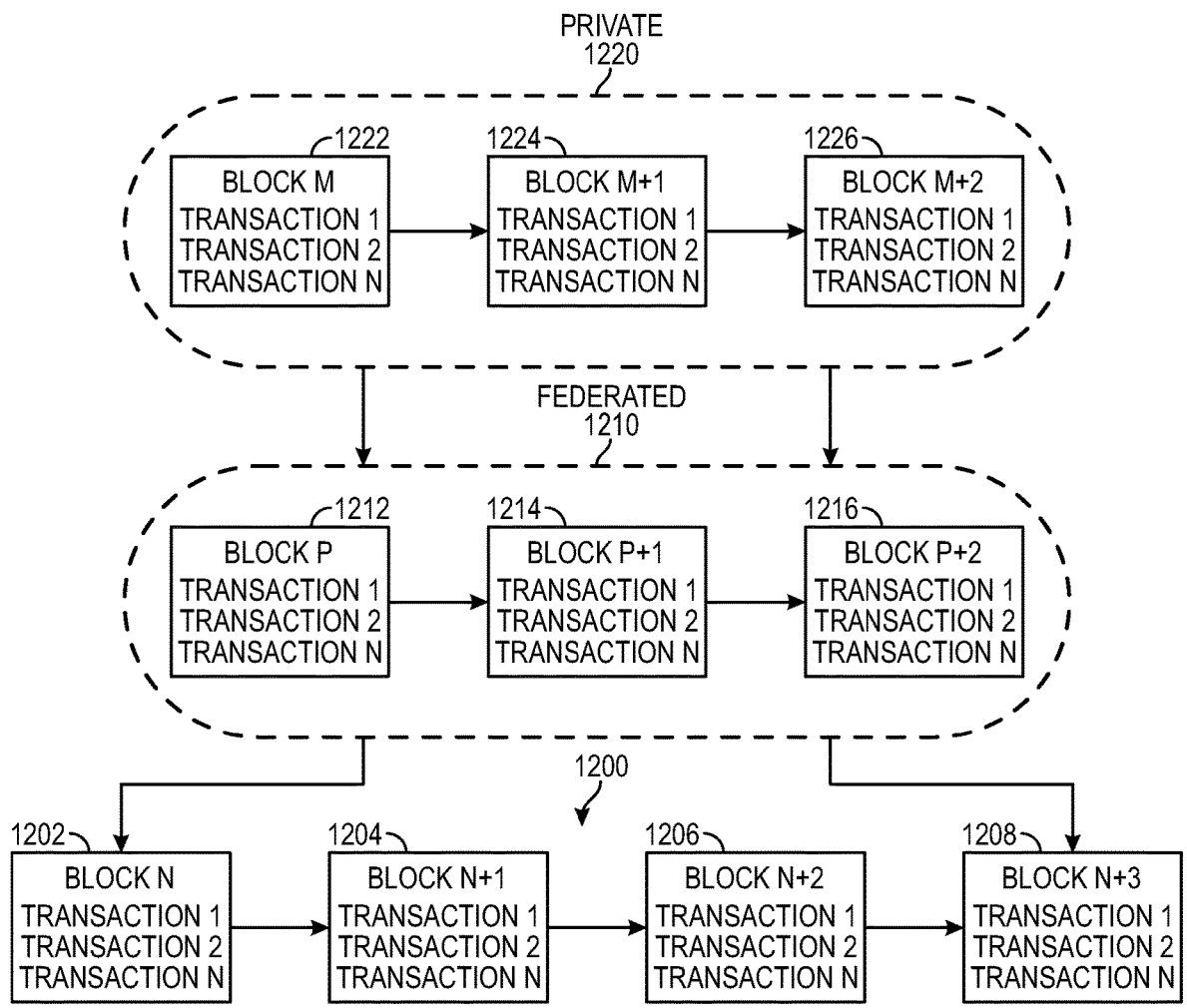
FIG. 12 illustrates an example distributed ledger including a blockchain layer having blocks of transactions and multiple side blockchains, side chains, or additional blockchain layers each maintained by different sets of nodes.

FIG. 12 depicts an exemplary distributed ledger similar to the hybrid distributed ledger environment 212 as shown in FIG. 2. The example distributed ledger includes a public distributed ledger layer 1200 including a blockchain having blocks 1202-1208 of transactions. In some embodiments, the blockchain 1200 includes several blocks 1202-1208 connected together to form a chain of blocks 1202-1208 of transactions. To cryptographically link blocks and transactions together, each block in the blockchain 1200 organizes its transactions into a Merkle Tree. In a Merkle Tree each transaction is hashed according to a cryptographic hashing algorithm (e.g., SHA-256) and the resulting output hash is then combined with the hash of another transaction. Then the combined result is also hashed according to the cryptographic hashing algorithm. This output is then combined with the hash of two other transactions and this process is repeated until all of the transactions in the block are combined and hashed to generate a Merkle root that is used in the header for a block 1202-1208. If any single transaction in the block is tampered with, a different Merkle root would be generated since the Merkle root is a combination of the hashes of all of the transactions in the block.

In other words, the transactions may be hashed using a cryptographic hash algorithm, such as the algorithms discussed above, and the hash of each transaction may be stored in the tree. As the tree is constructed the hash of each adjacent node at the same level may be hashed together to create a new node that exists at a higher level in the tree. Therefore, the node at the top of the tree or Merkle root, is dependent upon the hash of each transaction stored below in the tree. Each transaction may include a set of data. The set of data may include identifying data for the transaction, and transaction data identifying the nature of the transaction and what the transaction entails (e.g., input and output addresses, a transaction value, a document hash value, a timestamp, a transaction fee value, etc.).

To verify that a block is valid, a node may compare the Merkle root of the block to the Merkle root for the same block included in other nodes' copies of the blockchain. Thus, the Merkle root can be used as proof of the transactions included in the block and as proof that the contents of the block have not been tampered with if the Merkle root is the same in each node's copy of the block.

In one implementation, documents stored "on" a blockchain are documents that have been hashed according to a cryptographic hashing algorithm (e.g., SHA-256) and the resulting output hash has been included in a transaction in a block that has been accepted by the network nodes as satisfying the consensus rules of the blockchain. As such, the documents may be later verified or validated by comparing the hash of the documents to the hash stored on the blockchain. For example, if a set of documents results in a SHA-256 hash that was recorded on a blockchain on a certain date, then the blockchain provides cryptographic proof that the documents existed as of that date.

One way of storing a document on a blockchain is to broadcast a transaction including a hash of the document to the network, which will be included in a block if the transaction satisfies all of the consensus rules of the network. In some implementations, the blockchain is a permissioned ledger, meaning only authorized network participants may broadcast transactions. In other implementations, only some authorized network participants may make certain transactions. Only a cryptographic hash of the data may be included in the blockchain 1200, such that the data may be verified using the blockchain even if it is obtained by a party off-chain.

Validating network nodes may verify that the signed transaction or signed message was signed by the private cryptographic key corresponding to the published public cryptographic key owned by the device adding the property information. In at least one implementation, a valid proof-of-identity may be applied as a consensus rule by the blockchain network. As such, any transaction attempting to add new property information without a cryptographic proof-of-identity matching an identity authorized to add new property information is rejected by the network as non-compliant with the consensus rule. Each property owner may be assigned a public key/private key pair which is identified in the blockchain network as corresponding to the owner. If the validating network nodes receive a transaction regarding property information that is not from an authorized owner, the validating network nodes reject the transaction.

The blockchain 1200 may be referred to as the public blockchain layer in the distributed ledger. In addition to the public blockchain layer, the distributed ledger includes a federated blockchain layer 1210, and a private blockchain layer 1220. Each blockchain layer may be maintained by different validating nodes. For example, the public blockchain layer 1200 may be permissionless, and any party may view the public blockchain layer, submit new information to be added to the public blockchain layer, or join the network as a validating node. The federated blockchain 1210 layer may be permissioned, where only authorized participants can broadcast transactions to the federated distributed ledger network. Accordingly, the nodes validating transactions in the federated blockchain 1210 may need to be preapproved as authorized nodes before they can validate transactions in the federated blockchain 1210. The private blockchain layer 1220 may be maintained by nodes each corresponding to a single organization or entity.

In addition to the blockchain layers being maintained by different nodes, each blockchain layer may record different types of information. For example, as described above, the public blockchain layer 1200 may record identification information for each property, which is static and immutable. The federated blockchain layer 1210 may record ownership information for each property, which is dynamic. In some implementations, the public blockchain layer may additionally or alternatively include ownership information. The private blockchain layer 1220 may record transaction-related documents for each property, which are also dynamic. As mentioned above, in some implementations, the private blockchain layer 1220 may include cryptographic hashes of the documents rather than the documents themselves. In other implementations, the private blockchain layer 1220 records the documents themselves.

Still further, each blockchain layer may have a different set of consensus rules. The public blockchain layer may have a first set of consensus rules including that any suitable node can join the public blockchain network. The federated blockchain layer may have a second set of consensus rules requiring nodes in the federated blockchain network to have permission to join the network. The second set of consensus rules may include a list of preapproved nodes, and a node which is not permissioned may not record/validate transactions in the federated blockchain network. The private blockchain layer may have a third set of consensus rules requiring nodes in the private blockchain network to be controlled by the same, specified entity. The third set of consensus rules may determine whether a node is controlled by specified entity, and a node which is not controlled by the specified entity may not record/validate transactions in the private blockchain network.

Each set of consensus rules may also include a maximum transaction size, such that transactions in the respective blockchain network may not exceed the maximum transaction size. The maximum transaction size for the public blockchain network 1200 may be the smallest of the three, and the maximum transaction size for the private blockchain network 1220 may be the largest of the three. In this manner, the public blockchain layer 1200 may store less data per property than the federated and private blockchain layers 1210, 1220. The private blockchain layer 1220 may store property information requiring the most data. Memory storage requirements for the public blockchain layer 1200 may increase as more transactions are added to the public blockchain layer 1200. Accordingly, it may reduce memory requirements for validating nodes in the distributed ledger network to store some transactions off the public blockchain layer 1200. Additionally, the private blockchain layer 1220 may include private or sensitive data that is not meant to be shared outside of the nodes maintaining the private blockchain layer 1220.

Moreover, each set of consensus rules may include a type of property information which may be included in the respective distributed ledger layer. The consensus rules for the public blockchain layer 1200 may indicate that the public blockchain layer 1200 may only obtain identification information for properties or may obtain identification information and ownership information for properties. The consensus rules for the federated blockchain layer 1210 may indicate that the federated blockchain layer 1210 may only obtain ownership information for properties. The consensus rules for the private blockchain layer 1220 may indicate that the private blockchain layer 1220 may only obtain transaction-related documents for properties. Transactions that include types of information other than the allowed types of property information as indicated by the consensus rules may not be appended to the respective blockchain layer 1200-1220.

As described above, the hybrid distributed ledger environment 212 may be used to record any suitable property information. In one implementation, the hybrid distributed ledger environment 212 may record encumbrances on assets to maintain an accurate record of the encumbrances which is secure, immutable, and trustless. In other implementations, the record of encumbrances on assets may be maintained on any suitable distributed ledger, such as a blockchain, a tangle, a block lattice, or other directed acyclic graph (DAG). The distributed ledger may be public, private, federated, etc., and/or may include one or more layers or sidechains.

An asset may be a physical or digital asset including any original work of authorship fixed in a tangible medium of expression. This may include for example, creative works, brand, branded, or brandable works, shoes, trading cards, memorabilia, such as sports memorabilia, comic books, vehicles such as classic automobiles, stamps, coins, photographs, videos, paintings, sculptures, drawings, sketches, sound recordings, musical scores, song lyrics, written works, screenplays, scripts, books, short stories, articles, papers, collectibles, domain names, intellectual property, branded or unique merchandise, such as sports merchandise, etc. In some implementations, the asset may be copyrightable, patentable, and/or trademarked.

An encumbrance on an asset may include a copyforward royalty payment owed to the creator of the asset upon subsequent sales of the asset. For example, the creator may sell the asset to a first owner for $100,000. The sale may also include an encumbrance on the asset that a 5% royalty payment is owed to the creator each time the asset is resold to subsequent owners. Additionally, the encumbrance may include another royalty payment amount which is split amongst the previous owners of the asset which are not the original creator each time the asset is resold to subsequent owners (e.g., 5%). Additional encumbrances and royalties may be specified for other third parties. Moreover, the encumbrance may include a buyout amount which a subsequent owner may pay in addition to the sale price for the asset so that the subsequent owner does not owe any royalties to previous owners when reselling the asset.

For example, when an asset is first sold by a creator, the creator may include the following encumbrances on the asset: a 5% royalty payment owed to the creator each time the asset is resold to subsequent owners, a 5% royalty payment split amongst the previous owners of the which are not the original creator each time the asset is resold to subsequent owners, and a $500,000 buyout option.

The encumbrances described above are merely a few example encumbrances which may be recorded in a distributed ledger and are not intended to be limiting. The full unit economic model for the wide variety of encumbrances and royalty pool structures enabled by the copyforward system includes confidential trade secrets and know-how which is not described herein; the encumbrances may be arbitrarily complex.

FIG. 13 illustrates an example display 1300 of the revenue received by each owner according to these conditions. The asset may originally be sold from a first owner (the creator) to a second owner for $100,000. Accordingly, the first owner receives $100,000. Then the second owner may resell the asset to a third owner for $200,000. Accordingly, the first owner receives a $10,000 royalty as 5% of the $200,000 sale and the second owner receives the remaining amount of $190,000. Next, the third owner may resell the asset to a fourth owner for $300,000. The first owner receives $15,000 as 5% of the $300,000 sale, the second owner receives $15,000 as 5% of the $300,000 sale since the second owner is the only previous owner who is not the creator, and the third owner receives the remaining amount of $270,000. Then, the fourth owner may resell the asset to a fifth owner for $400,000. The first owner receives $20,000 as 5% of the $400,000 sale, the second owner and third owners split $20,000 as 5% of the $400,000 sale for $10,000 each, and the fourth owner receives the remaining amount of $360,000. The fifth owner may resell the asset to a sixth owner for $500,000. The first owner receives $25,000 as 5% of the $500,000 sale, the second, third, and fourth owners split $25,000 as 5% of the $500,000 sale for $8,333 each, and the fifth owner receives the remaining amount of $450,000. Then, the sixth owner may resell the asset to a seventh owner for $600,000. The first owner receives $30,000 as 5% of the $600,000 sale, the second, third, fourth, and fifth owners split $30,000 as 5% of the $600,000 sale for $7,500 each, and the sixth owner receives the remaining amount of $540,000.

In some implementations, the validating nodes and/or the entity managing the system may receive a transaction fee each time the asset is transferred. The transaction fee may be a percentage of the sale price or a fixed fee.

In many instances, the value of an asset appreciates exponentially upon subsequent sales of the asset. By allowing the creator and subsequent owners to receive royalty payments upon each resale of the asset, the creator may receive a larger percentage of the full value of the asset. In this manner, the creator (and early investors) may obtain more of the reward for the work that the creator put in when creating the asset. This allows for a more fair and just system, where a buyer much further down in the chain does not receive most of the value from the appreciation in value of the asset over time while the original creator obtains only a small fraction.

Still further, the copyforward system utilizes a distributed ledger to record the encumbrances, ownership transfers, and payment amounts and royalties paid to each owner due to the ownership transfers. The distributed ledger may be the hybrid distributed ledger environment 212 as shown in FIGS. 2 and 12 or any other suitable distributed ledger.

By recording the encumbrances and history of royalty payments in a distributed ledger as opposed to a centralized database, the owners do not need to rely on and trust a centralized authority to prove the royalty amounts that are owed to them. With a centralized authority, hackers may gain access to the database and change the royalty percentages or ownership information and a creator may receive a lower royalty percentage than the creator originally agreed to, may be changed in the system from the creator to a subsequent owner resulting in a lower royalty percentage, or may be changed in the system to not being an owner at all and may not receive any royalties. Moreover, when the asset has been transferred several times over a long time period, the list of owners and corresponding royalties owed to each owner may grow very large and become complicated. The distributed ledger allows for a system which is secure, immutable, and trustless such that a growing list of owners does not result in an increased likelihood that one of the owners will be forgotten or will not receive royalty payments upon subsequent sales of the asset. The distributed ledger may handle such a complicated system in a manageable way due to the immutable nature of the distributed ledger. Once a transaction is recorded in the distributed ledger indicating an ownership transfer and/or encumbrance, the transaction cannot be undone and is copied to each of the validating nodes. Therefore, the distributed ledger significantly reduces the likelihood that ownership information, encumbrances, and/or historical royalty payments are modified, purged, lost, destroyed, or removed over time compared to a centralized system.

Figure 14:
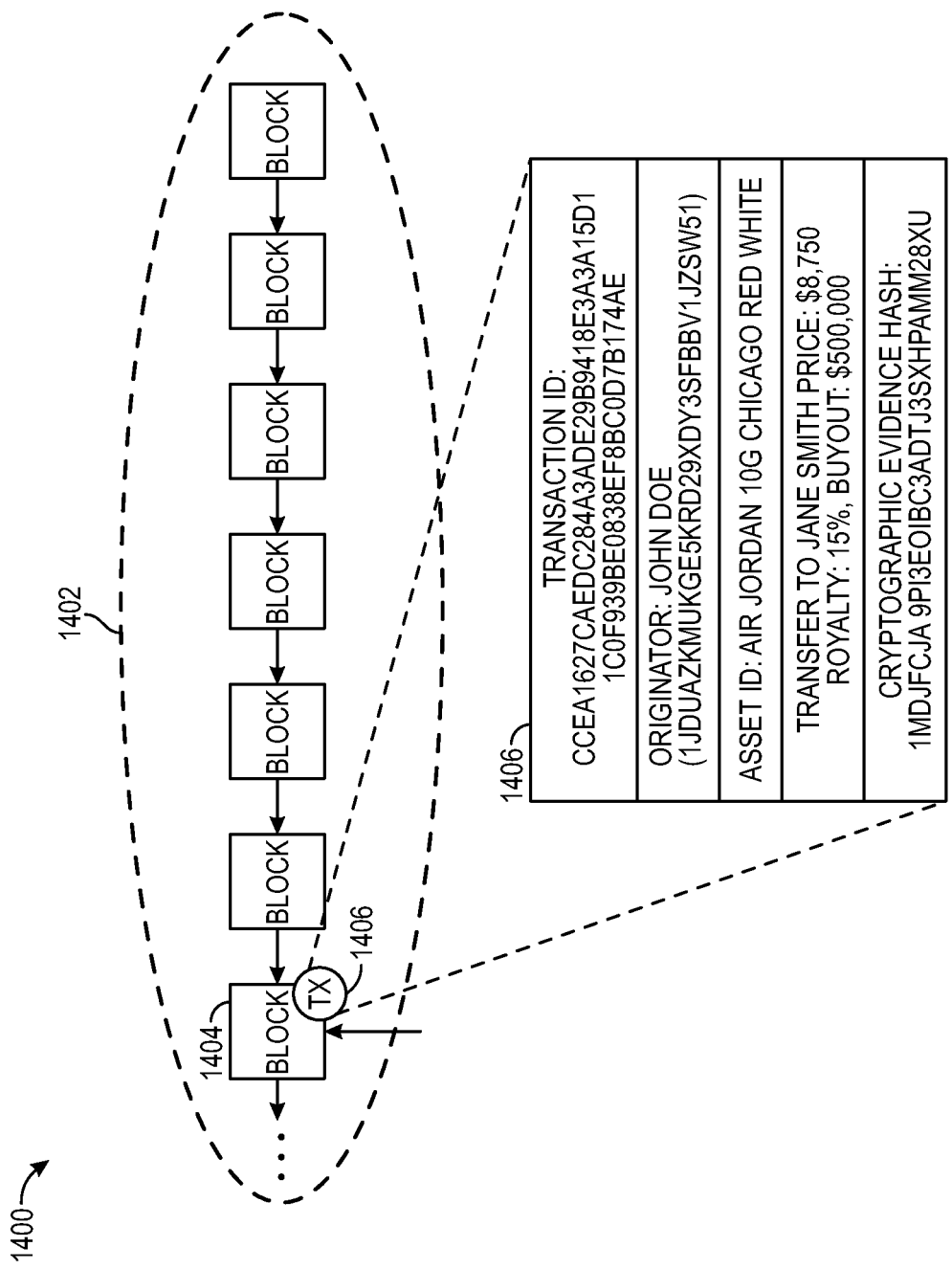
FIG. 14 illustrates an exemplary transaction recording a property transfer of an asset which includes an encumbrance on the asset, such as a copyforward royalty payment owed to the creator upon subsequent sales of the asset.

FIG. 14 illustrates an exemplary transaction 1400 in the copyforward system recording an ownership transfer of Air Jordan shoes with a copyforward royalty payment owed to the creator or original owner upon subsequent sales of the asset. The transaction 1406 may include a transaction ID and an originator such as John Doe who is the creator or original owner of the shoes (identified by a cryptographic proof-of-identity). The transaction 1406 may also include identification information for the asset, such as a brand name of the asset (Air Jordan), a size of the asset (10G), a description of the asset (Chicago Red White), a unique identification number for the asset such as a serial number, etc. Furthermore, the transaction 1406 may include identification information for the subsequent owner receiving the asset (Jane Smith), the sales price for the transfer ($8,750), and/or encumbrances on the asset, such as a royalty payment owed to the creator or original owner of the asset upon subsequent sales of the asset (15%), fractions of the royalty payment owed to downstream owners such as a royalty payment amount which is split amongst the previous owners of the asset which are not the original owner or creator each time the asset is resold to subsequent owners, a buyout amount ($500,000) which a subsequent owner may pay in addition to the sale price for the asset so that the subsequent owner does not owe any royalties to previous owners when reselling the asset.

Additional transactions may include transfers to subsequent owners which may include the sale price for the transfer, whether the buyer utilized the buyout option, and/or a list of royalty payment amounts owed to previous owners as a result of the transfer. In some implementations, the transactions may be transmitted to a smart contract that automatically distributes the royalty payment amounts in accordance with the sale price, the ownership information, and the encumbrances on the asset.

In other implementations, a server device may monitor the distributed ledger to obtain each of the transactions that include an asset. When the asset is transferred to a subsequent owner, the server device may determine the royalty payment amounts owed to each previous owner by analyzing the transactions to determine the royalty percentages owed to each previous owner and applying the royalty percentages to the sale price. This is described in more detail below with reference to FIG. 21.

Figure 15:
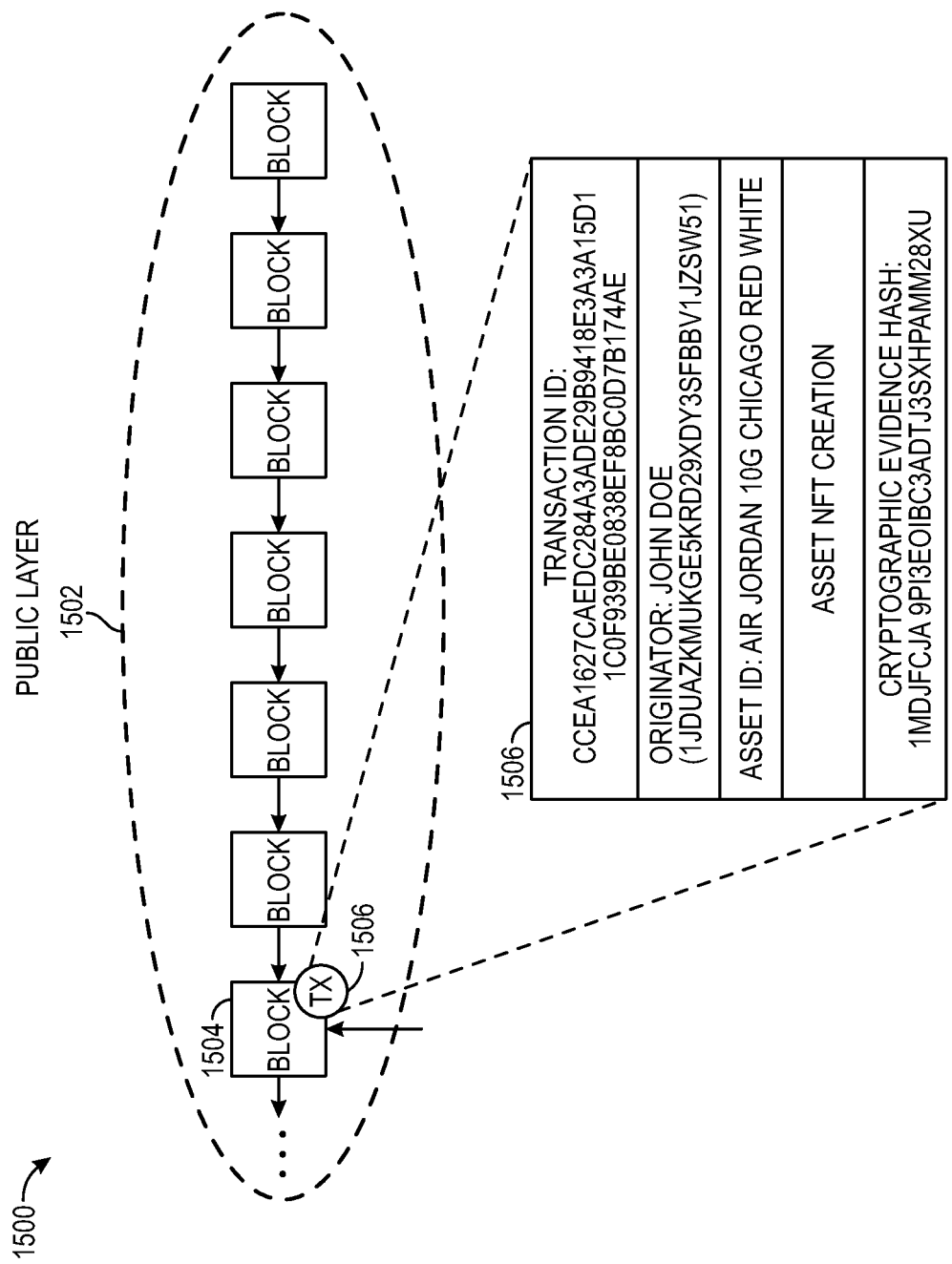
FIG. 15 illustrates an exemplary transaction recording identification information for an asset in a public distributed ledger layer of the distributed ledger illustrated in FIG. 12.
Figure 16:
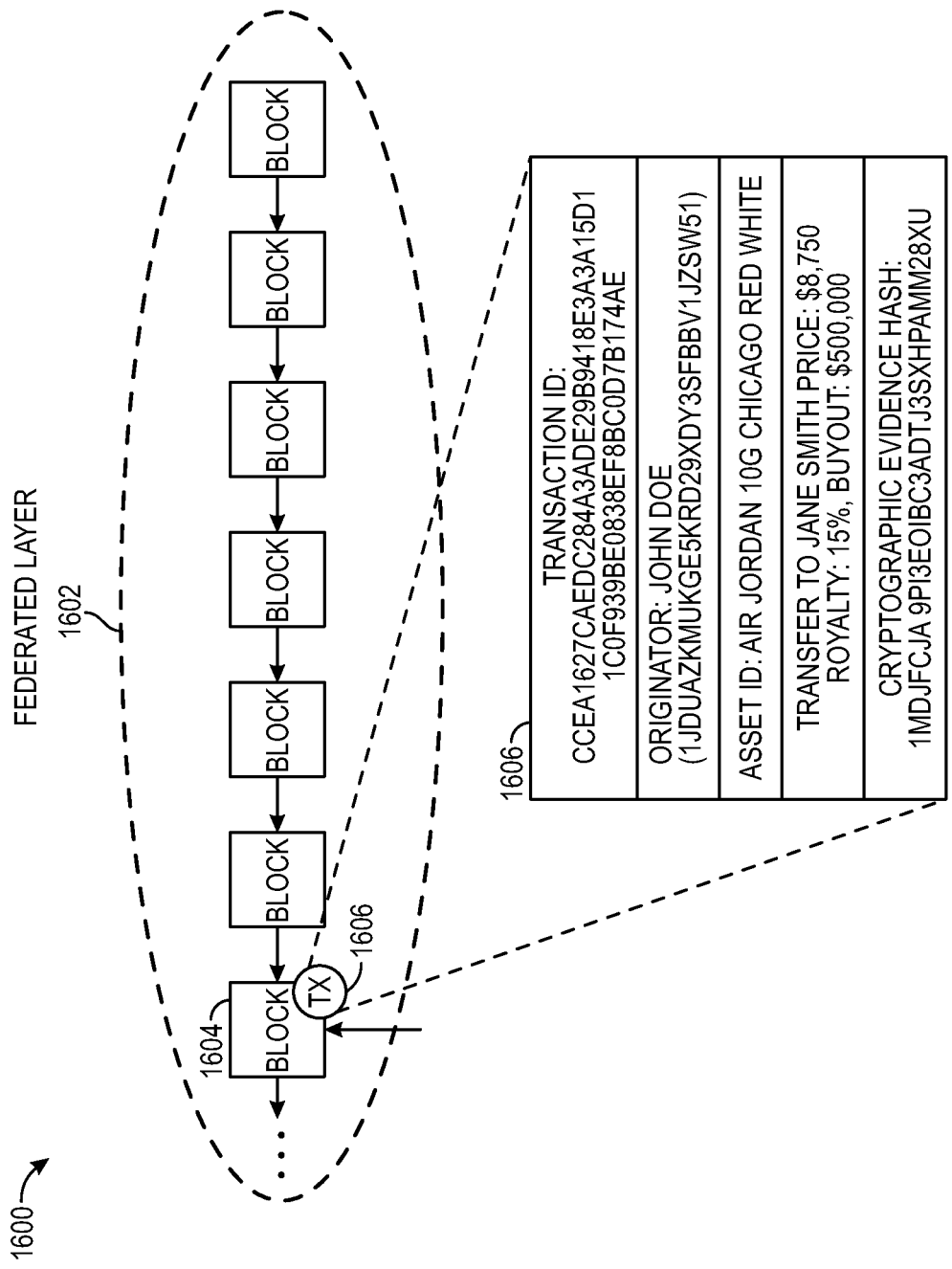
FIG. 16 illustrates an exemplary transaction recording ownership information for the asset in a federated distributed ledger layer of the distributed ledger illustrated in FIG. 12.
Figure 17:
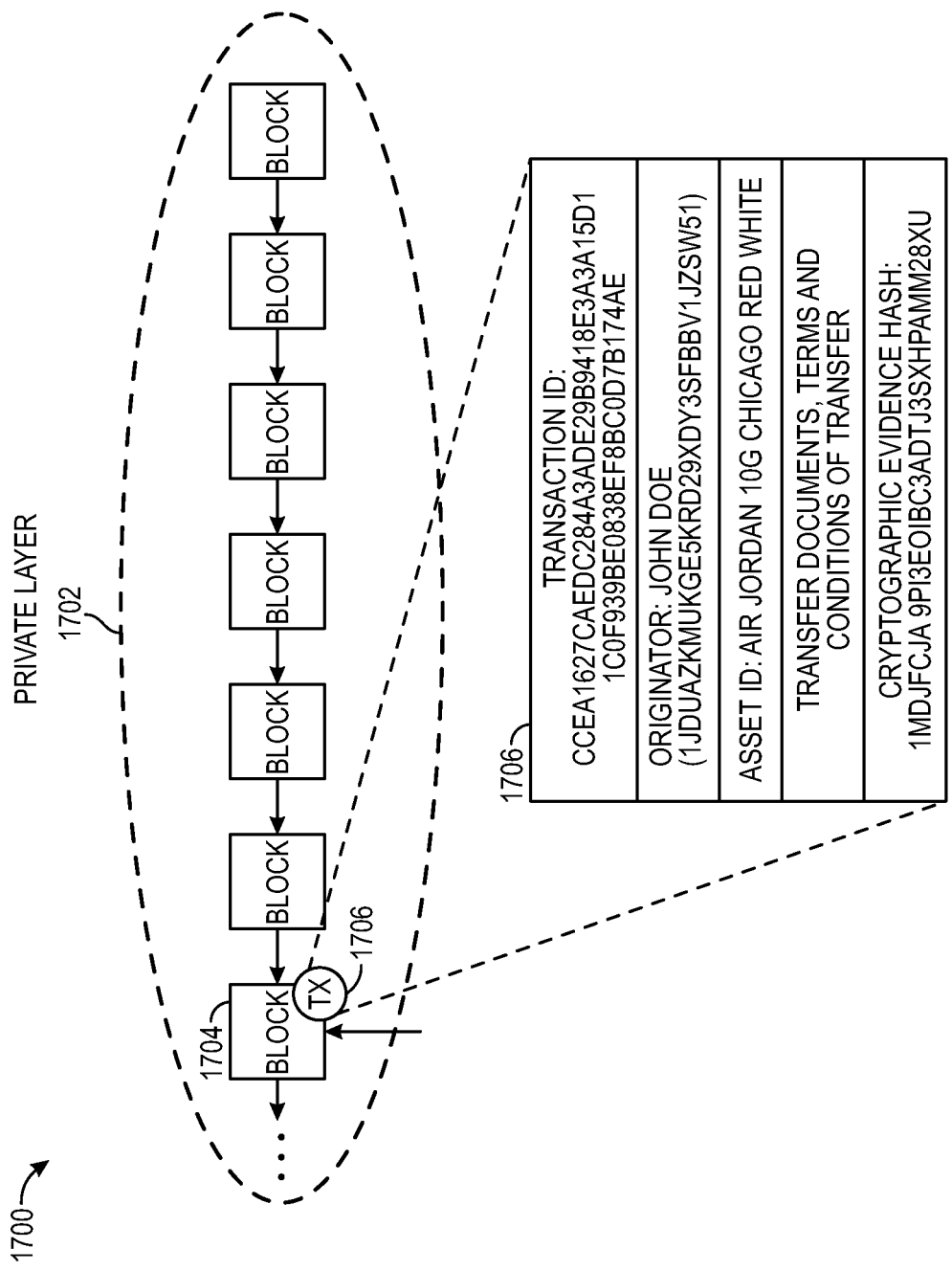
FIG. 17 illustrates an exemplary transaction recording transaction-related documents for the transfer of the asset to a new owner in a private distributed ledger layer of the distributed ledger illustrated in FIG. 12.

As mentioned above, in some embodiments, the copyforward system may be implemented using the hybrid distributed ledger environment 212 as shown in FIGS. 2 and 12. FIGS. 15-17 illustrate example transactions for recording identification information, ownership information, and transaction-related documents for an asset in public, federated, and private distributed ledger layers, respectively, of the distributed ledger illustrated in FIG. 12.

FIG. 15 illustrates an exemplary transaction 1506 recording identification information for an asset in a public distributed ledger layer 1502 of the distributed ledger illustrated in FIG. 12. The transaction 1506 may include a transaction ID and an originator such as John Doe who is the creator or original owner of the shoes (identified by a cryptographic proof-of-identity). The transaction 1506 may also include identification information for the asset, such as a brand name of the asset (Air Jordan), a size of the asset (10G), a description of the asset (Chicago Red White), a unique identification number for the asset such as a serial number, etc. In another example where the asset is a piece of artwork, the identification information may include the name of the artist or artists, the name of the art piece, the year created, materials used, the genre (e.g., impressionist), the weight, image file(s), dimensions, etc.

In some implementations, the transaction may mint an NFT representing the asset which includes properties of the asset, such as the identification information. The NFT may be recorded in the public distributed ledger layer 1502 and referred to in the federated and private distributed ledger layers via wrapped NFTs or in any other suitable manner. Furthermore, the transaction 1506 may include a cryptographic hash of the identification information. In another implementation, the identification information is not stored as a cryptographic hash, but is directly accessible in block 1504 by an observer or other network participant.

In other implementations, an NFT representing the asset may be obtained from an external system. The transaction may then record the obtained NFT or a wrapped version in the public distributed ledger layer 1502.

FIG. 16 illustrates an exemplary transaction 1606 recording ownership information for the asset in a federated distributed ledger layer 1602 of the distributed ledger illustrated in FIG. 12. In some implementations, the public distributed ledger layer 1502 may additionally or alternatively include ownership information for the asset. The transaction 1606 may include a transaction ID and an originator such as John Doe who is the creator or original owner of the shoes (identified by a cryptographic proof-of-identity). A validating network node may verify that the signed transaction or signed message was signed by the private cryptographic key corresponding to the published public cryptographic key owned by the current owner of the asset. In at least one implementation, a valid proof-of-identity may be applied as a consensus rule by the federated distributed ledger network. As such, any transaction attempting to change ownership information without a cryptographic proof-of-identity (e.g., signed private cryptographic keys) matching an identity authorized to change ownership information is rejected by the network as non-compliant with the consensus rule. Each property owner may be assigned a public key/private key pair which is identified in the federated distributed ledger network as corresponding to the owner. If the validating network nodes receive a transaction regarding ownership information that is not from an authorized owner, the validating network nodes reject the transaction.

The transaction 1606 may also include a reference to the asset, such as a wrapped NFT that references the NFT representing the asset in the public distributed ledger layer 1502. Furthermore, the transaction 1606 may include identification information for the subsequent owner receiving the asset (Jane Smith), the sales price for the transfer ($8,750), and/or encumbrances on the asset, such as a royalty payment owed to the creator or original owner of the asset upon subsequent sales of the asset (15%), a royalty payment amount which is split amongst the previous owners of the asset which are not the original owner or creator each time the asset is resold to subsequent owners, a buyout amount ($500,000) which a subsequent owner may pay in addition to the sale price for the asset so that the subsequent owner does not owe any royalties to previous owners when reselling the asset. Moreover, the transaction 1606 may include a cryptographic hash of the ownership information. In another implementation, the ownership information is not stored as a cryptographic hash, but is directly accessible in block 1604 by an observer or other network participant.

In some implementations, the ownership information includes the sale price for the transfer and a description of the encumbrances on the asset without including the documents related to the sale of the asset, such as contracts, title documents, documents describing encumbrances, etc. In other implementations, the sale price for the transfer and the description of the encumbrances are not included in the ownership information or the federated distributed ledger layer. Instead, the sale price and/or description of the encumbrances are included in the private distributed ledger layer.

Also in some implementations, a user may transmit the transaction 1606 to a smart contract address for a smart contract on the federated distributed ledger layer, where the smart contract transfers the NFT or wrapped NFT from the owner/seller to the buyer upon determining for example, that the transaction 1606 is cryptographically signed by the owner/seller to prove the identity of the owner/seller.

FIG. 17 illustrates an exemplary transaction 1706 recording transaction-related documents for the transfer of the asset to a new owner in a private distributed ledger layer 1702 of the distributed ledger illustrated in FIG. 12. The transaction 1706 may include a transaction ID and an originator such as John Doe who is the creator or original owner of the shoes (identified by a cryptographic proof-of-identity). The transaction 1606 may also include a reference to the asset, such as a wrapped NFT that references the NFT representing the asset in the public distributed ledger layer 1502. Furthermore, the transaction 1706 may include transaction-related documents related to the sale of the asset, such as contracts, title documents, documents describing encumbrances, etc. The transaction-related documents may include the terms and conditions of the sales of the asset, such as the sale price, a royalty payment owed to the creator or original owner of the asset, a royalty payment amount which is split amongst the previous owners of the asset, a buyout amount, etc. Furthermore, the transaction 1706 may include a cryptographic hash of the transaction-related documents. In another implementation, the transaction-related documents are not stored as a cryptographic hash, but are directly accessible in block 1704 by an observer or other network participant. In some implementations, a user may transmit the transaction 1706 to a smart contract address for a smart contract on the private distributed ledger layer, where the smart contract modifies the transaction-related documents.

Figure 19:
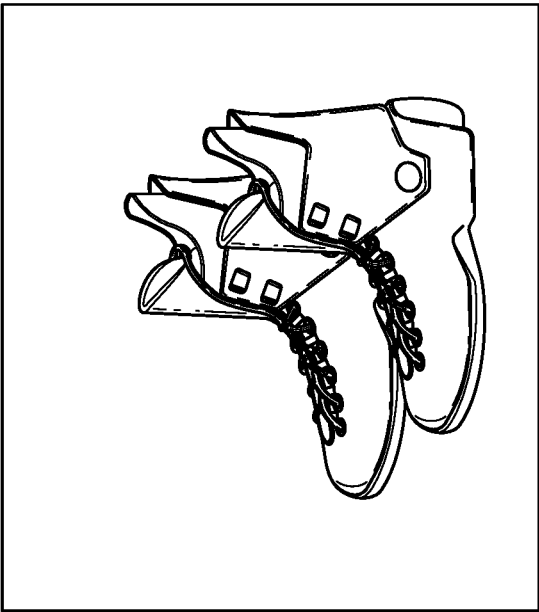
FIG. 19 illustrates an exemplary display for listing an asset for sale.

To facilitate the sale of assets and ensure the appropriate royalty payments are made, the copyforward system generates and displays user interfaces on client devices of users. A client device may be a smart phone, a tablet, a laptop computer, a desktop computer, a wearable device such as a smart watch or smart glasses, etc. The client devices may communicate directly with a distributed ledger, such as the distributed ledger as shown in FIG. 12. In other implementations, a server device may monitor the distributed ledger, obtain property information from the distributed ledger, and provide the property information to a client device for display to the user. FIGS. 18-20 illustrate example user interface which may be presented to users on client devices in the copyforward system.

FIG. 18 illustrates an example display 1800 of the assets associated with a user, which may be presented on the user's client device. The display 1800 includes indications of each of the assets owned or created by the user, indications of each of the assets subsequently purchased by the user, and indications of each of the assets sold by the user. Furthermore, for each asset, the display 1800 includes an indication of the status of the asset (owned, purchased, sold, etc.), a royalty payment amount owed to the user upon subsequent sales of the asset, an asset type (e.g., sneakers, sports card, comic book, etc.), a purchase price which the user paid to acquire the asset, a sale price which the user sold the asset for or is selling the asset for or a market price of the asset, and a description of the asset (e.g., 1985 Air Jordan 1 High Blue Metallic—never worn—still in box). In some implementations, the assets may be sorted by genre, price, dated created, date of purchase, or in any other suitable manner.

In some implementations, a server device may obtain this information from a distributed ledger, such as the distributed ledger as shown in FIG. 12 and provide property information for assets associated with the user to the user's client device. For example, the user may be assigned a cryptographic public key or address in the distributed ledger network. The server device may monitor the distributed ledger for transactions including the user's cryptographic public key or address to obtain the property information for the assets associated with the user.

The display 1800 also includes user controls for adding a new asset by for example, minting an NFT representing the asset, recording and linking to an existing NFT or RDF representing the asset, recording a transfer of the asset from the user to a subsequent owner, tracking assets, accelerating royalty payments, exchanging royalties, adding an asset to a collection of assets, removing assets from collections of assets, specifying terms and conditions for the transfer of the asset, etc.

In response to selecting the user control to add a new asset, the client device may present a display such as the display 1900 as shown in FIG. 19 for listing an asset for sale. The display 1900 may include user controls for entering an asset type (sports sneakers), a starting sale price for the asset, a name or other identification information for the asset, a detailed description of the asset, a number of previous owners of asset, an image of the asset, and/or any other information or files. When the user provides this information, the client device may provide the property information for the asset to the server device. The server device may then generate and transmit a transaction to the distributed ledger, for example to mint an NFT representing the asset in the public distributed ledger layer based on the provided information. The NFT may include properties such as the asset type, a name or other identification information for the asset, a detailed description of the asset, an image of the asset, etc. In other implementations, the client device may generate and transmit a transaction to the distributed ledger, for example to mint the NFT representing the asset. The server device may then transmit data to the client device to update the display 1800 of FIG. 18 to include the new asset in the list of assets owned or created by the user.

In some implementations, in addition to user controls for entering the starting sale price for the asset, the display 1900 may include user controls for encumbrances on the asset, such as copyforward royalty payments on subsequent sales of the asset, a buyout amount, etc.

When a purchaser agrees to buy the asset, the client device may present a display such as the display 2000 as shown in FIG. 20 for entering the terms of an agreement between the buyer and seller of an asset. The display 2000 may include user controls for entering an asset type (sports sneakers), identification information for the seller of the asset (Jack Mikary), a name or other identification information for the asset, identification information for the buyer of the asset, such as a name (Chicks with Kicks), phone number, and email address of the buyer, and terms and conditions of the sale. The terms and conditions may include a sale price ($8,750), a copyforward royalty percentage owed to the seller upon each subsequent sale of the asset (15%), and a buyout amount (none). The terms and conditions may also include fractions of the royalty percentage owed to downstream owners.

When the user provides this information, the client device may provide the terms of the agreement for the sale of the asset to the server device. The server device may identify an encumbrance on the asset and generate and transmit a transaction or transactions to the distributed ledger to record the change of ownership, sale price, and encumbrance on the asset. For example, the server device may transmit a first transaction to the federated distributed ledger layer to record the change of ownership and include a sale price and a description of the copyforward royalty payment amount owed to the seller. The first transaction may be augmented with a cryptographic signature from the owner/seller (Jack Mikary) to prove the identity of the owner/seller. The server device may transmit a second transaction to the private distributed ledger layer to record the contracts, title documents, documents describing encumbrances, etc., involved in the transfer. In other implementations, the client device may generate and transmit the transaction or transactions to the distributed ledger to record the change of ownership, sale price, and encumbrance on the asset.

The server device may then transmit data to the client device to update the display 1800 of FIG. 18 to reflect the sale of the asset, the sale price, and the copyforward royalty percentage owed to the user.

Also in some implementations, prior to recording the change of ownership, the server device may communicate with a third-party certificate authority to generate a certificate of authenticity for the owner of the asset. The certificate may include a description of the asset, such as a name of the property, a location of the property, a unique identification number for the property, etc., and identification information for the owner of the asset, such as a name of the person or organization that currently owns the asset, an address of the current owner, a phone number of the current owner, etc. The certificate may also include distributed ledger information for the asset, such as a reference to the NFT representing the property (e.g., a token ID and/or smart contract address for the NFT). If the certificate authority provides the certificate to the server device, the server device may transmit the transaction to the distributed ledger to record the change of ownership. Otherwise, the server device does not transmit a transaction to the distributed ledger to record the change of ownership since the certificate authority cannot verify that the seller of the asset is the owner.

In some implementations, the server device or the third-party may mint and issue certificates of authenticity and the server device may record the certificate of authenticity in a distributed ledger. In other implementations, the server device may record certificates of authenticity obtained from external systems in the distributed ledger.

Figure 21:
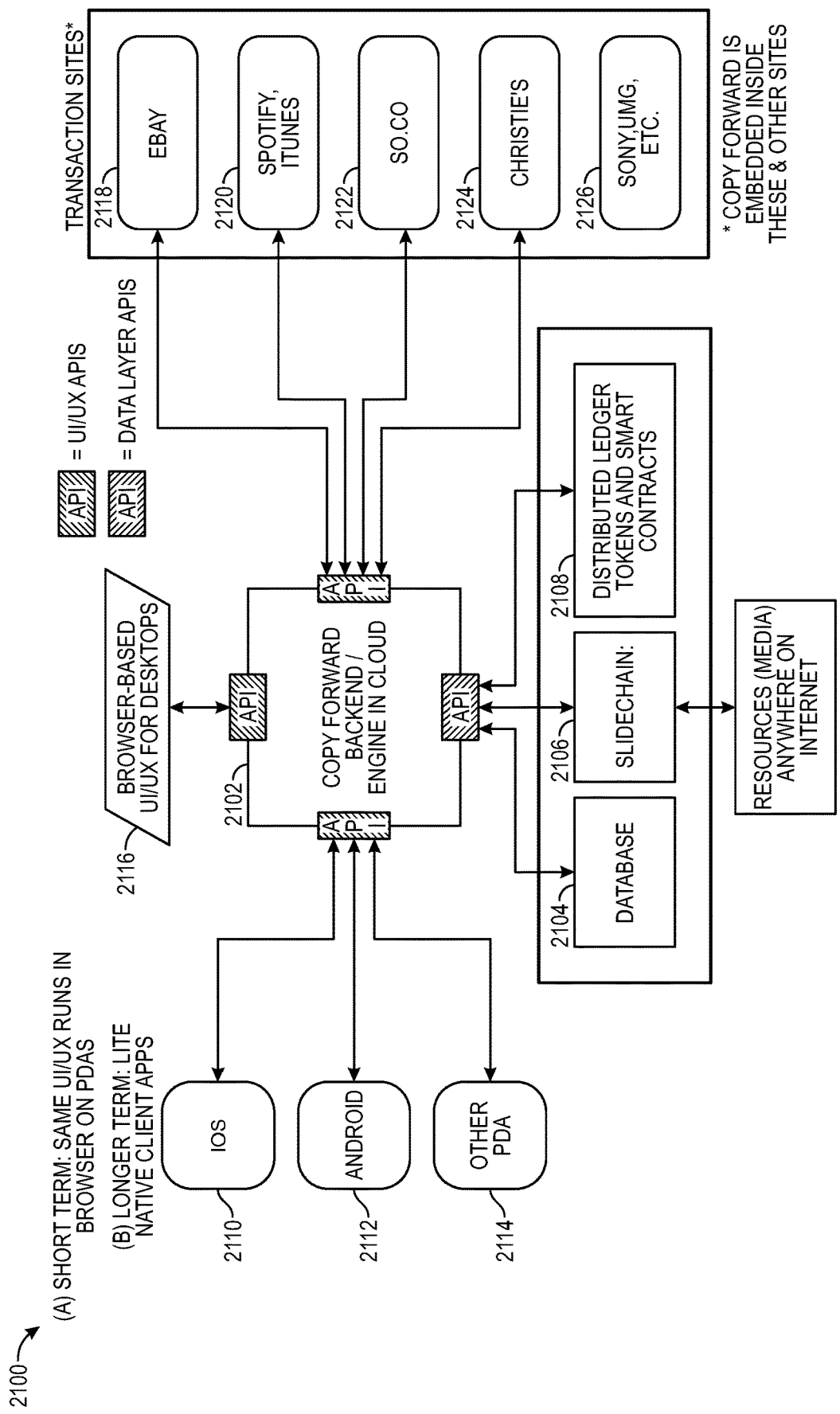
FIG. 21 illustrates a high-level architectural view of one example implementation of the copyforward system.

FIG. 21 illustrates an example communication system 2100 for implementing the copyforward system. The communication system 2100 includes a server device 2102 for monitoring the distributed ledger layer(s) and/or database(s) (e.g., a semantic graph database, a resource description framework (RDF), etc.) 2104-2108 and providing property information for assets to client devices via client applications 2110-2114 or browser web pages 2116. The server device 2102 may communicate with the distributed ledger layer(s) and/or database(s) via data layer application programming interfaces (APIs) and may communicate with the client devices via user interface APIs.

In addition to monitoring the distributed ledger layer(s) and/or database(s) 2104-2108, the server device 2102 may transmit transactions to the distributed ledger layer(s) and/or database(s) 2104-2108 via the data layer APIs. The transactions may mint new NFTs, record ownership transfers, record encumbrances, etc.

Still further, the server device 2102 may communicate with transaction websites or applications to sell the assets on the transaction websites or applications 2118-2126, and include encumbrances on the sale such as copyforward royalty payments. For example, the server device 2102 may communicate with the transaction websites or applications to load assets or collections of assets to the transaction websites or applications.

Moreover, the server device 2102 may communicate with transaction websites or applications 2118-2126 to obtain sales information when an asset is sold and transmit transactions to the distributed ledger layer(s) and/or database(s) 2104-2108 indicating the sales information. For example, the server device 2102 may communicate with the transaction websites or applications to load assets or collections of assets from the transaction websites or applications.

Figure 22:
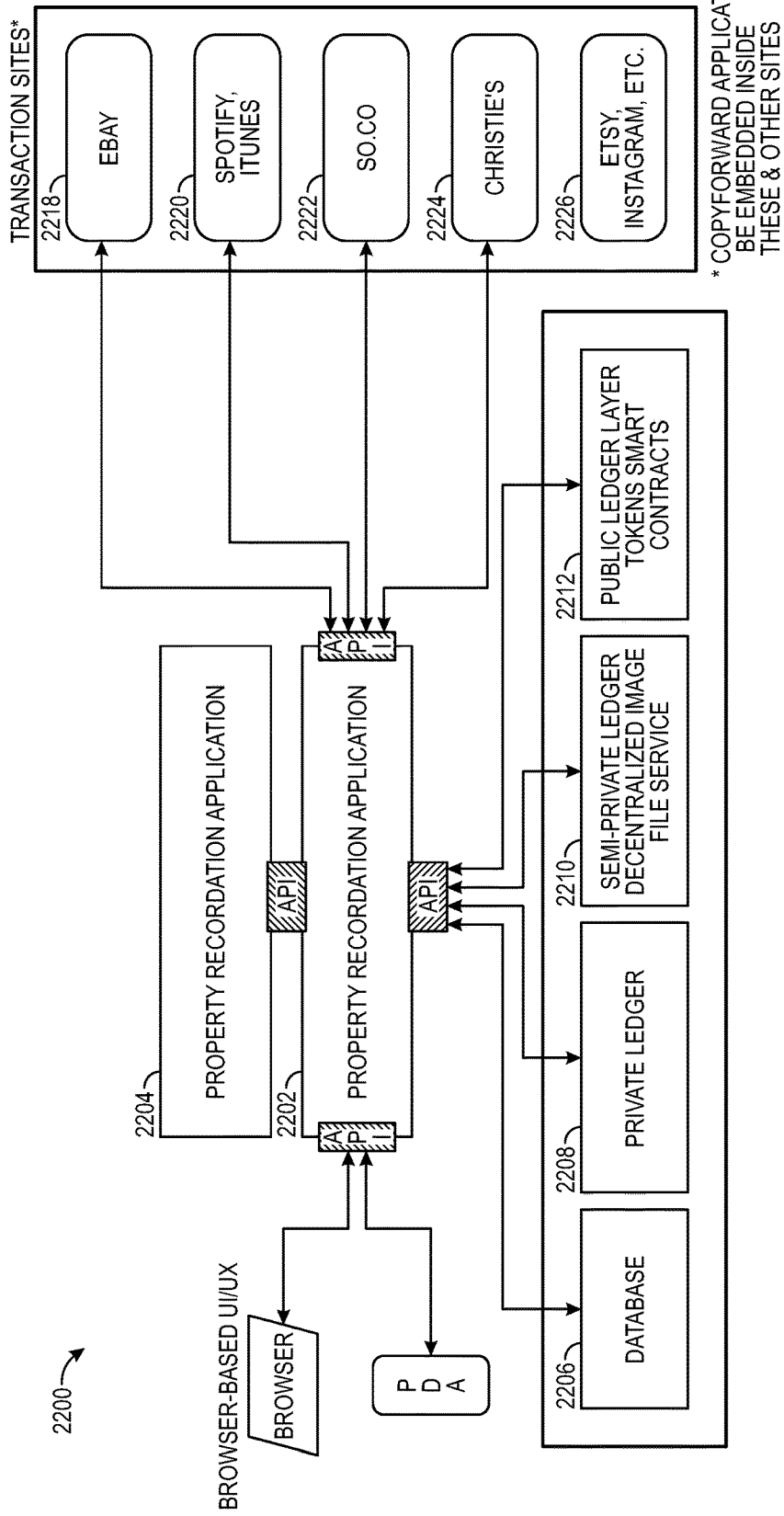
FIG. 22 illustrates a high-level architectural view of the property recordation system.

FIG. 22 illustrates an example communication system 2200 for implementing the property recordation system. The communication system 2200 includes a property recordation server 2202 for monitoring the distributed ledger layer(s) and/or database(s) (e.g., a semantic graph database, a resource description framework (RDF), etc.) 2206-2212 and providing property information for properties to client devices via a property recordation application 2204. The property recordation server 2202 may monitor the distributed ledger layer(s) and/or database(s) 2206-2212 to find information for a property, find encumbrances for a property, clear encumbrances for a property, identify title defects for a property, correct and clear title defects for a property, find and correct title defects introduced by human error, mistyped names, or transcription errors from paper-based documents and other non-automated sources, missing property descriptions or incorrect legal descriptions, vehicles and watercraft including incorrect owner information (e.g., misspelled name, address), incorrect mileage, transcription errors, incorrect make, year model, or body style, incorrect lienholder(s), dates of lien(s), and lien release(s), and incorrect title number or incorrect Vehicle Identification Number (VIN), or in the case of boats, an incorrect boat length, hull type, or Hull Identification Number (HIN). The property recordation server 2202 may also monitor the distributed ledger layer(s) and/or database(s) 2206-2212 to find and correct title defects for real property including ineffective notarial clauses, invalid powers of attorney, deeds by minors, improperly recorded documents, undisclosed heirs, gaps in the chain of title, false impersonations, errors in tax records, IRS or tax liens, forged documents, and non-recorded defects which include bankruptcy, divorce, civil litigation, child support, liens (IRS, nuisance), and violations (municipal codes, utilities). Still further, the property recordation server 2202 may monitor the distributed ledger layer(s) and/or database(s) 2206-2212 to find and correct title defects for aircraft titles including separate encumbrances on the airframe, the propeller(s), and the engine(s). The property recordation server 2202 may also transmit transactions to load assets or collections of assets from the transaction websites or applications.

In addition to monitoring the distributed ledger layer(s) and/or database(s) 2206-2212, the property recordation server 2202 may transmit transactions to the distributed ledger layer(s) and/or database(s) 2206-2212 via the data layer APIs. The transactions may mint new NFTs, record ownership transfers, record encumbrances, etc. The transactions may record information for a property (e.g., when a Certificate of Origin for the property is created and issued), record cleared encumbrances for a property, record corrected and cleared title defects for a property, record corrected title defects introduced by human error, mistyped names, or transcription errors from paper-based documents and other non-automated sources, missing property descriptions or incorrect legal descriptions, vehicles and watercraft including incorrect owner information (e.g., misspelled name, address), incorrect mileage, transcription errors, incorrect make, year model, or body style, incorrect lienholder(s), dates of lien(s), and lien release(s), and incorrect title number or incorrect Vehicle Identification Number (VIN), or in the case of boats, an incorrect boat length, hull type, or Hull Identification Number (HIN). The property recordation server 2202 may also transmit transactions to record corrected title defects for real property including ineffective notarial clauses, invalid powers of attorney, deeds by minors, improperly recorded documents, undisclosed heirs, gaps in the chain of title, false impersonations, errors in tax records, IRS or tax liens, forged documents, and non-recorded defects which include bankruptcy, divorce, civil litigation, child support, liens (IRS, nuisance), and violations (municipal codes, utilities). Still further, the property recordation server 2202 may transmit transactions to record corrected title defects for aircraft titles including separate encumbrances on the airframe, the propeller(s), and the engine(s). The property recordation server 2202 may also transmit transactions to load assets or collections of assets to the transaction websites or applications.

Still further, the property recordation server 2202 may communicate with transaction websites or applications 2218-2226 to sell the properties on the transaction websites or applications. Moreover, the property recordation server 2202 may communicate with transaction websites or applications 2218-2226 to obtain sales information when a property is sold and transmit transactions to the distributed ledger layer(s) and/or database(s) 2206-2212 indicating the sales information.

This detailed description is to be construed as exemplary only and does not describe every possible embodiment, as describing every possible embodiment would be impractical, if not impossible. One may be implement numerous alternate embodiments, using either current technology or technology developed after the filing date of this application.

Although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a business or home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed:

1. A system for managing encumbrances associated with assets using a secure, immutable ledger, the system comprising:
   one or more processors; and
   a non-transitory computer-readable medium coupled to the one or more processors and storing instructions thereon, that when executed by the one or more processors, causes the one or more processors to:
   identify one or more encumbrances on an asset when the asset is transferred from one or more owners to one or more new owners;
   generate a transaction including a transfer of the asset from the one or more owners to the one or more new owners and a description of the one or more encumbrances;
   augment the transaction with one or more cryptographic hashes;
   augment the transaction with evidence of authenticity; and
   record the transaction including the description of the one or more encumbrances in a secure, immutable ledger.

2. The system of claim 1, wherein the one or more encumbrances include at least one of:
   (i) a first royalty percentage owed to a first owner,
   (ii) a second royalty percentage owed to downstream owners other than the first owner, (iii) a third royalty percentage owed to one or more parties other than the first owner r and the downstream owners, or (iv) a buyout option.

3. The system of claim 1, wherein the instructions further cause the one or more processors to:
augment the transaction with a cryptographic signature from the one or more owners to prove the identity of the one or more owners.

4. The system of claim 1, wherein the evidence of authenticity is generated by a third-party authority.

5. The system of claim 1, wherein the evidence of authenticity is generated by the system using one or more artificial intelligence elements, machine intelligence elements, or machine learning elements.

6. The system of claim 1, wherein information for the evidence of authenticity is obtained from an external evidence oracle or source.

7. The system of claim 1, wherein the instructions further cause the one or more processors to:
transmit the transaction to a smart contract that includes an ancillary text component and is configured to automatically distribute royalties upon transfer of the asset to another owner in accordance with the encumbrance.

8. The system of claim 1, wherein the instructions further cause the one or more processors to:
automatically generate a contract, an enforcement action, or a report using one or more artificial intelligence elements, machine intelligence elements, or machine learning elements.

9. The system of claim 1, wherein the instructions further cause the one or more processors to:
automatically predict a price or price range of the asset using one or more artificial intelligence elements, machine intelligence elements, or machine learning elements.

10. The system of claim 1, wherein the asset is at least one of: shoes, a trading card, memorabilia, a comic book, a vehicle, a stamp, a coin, a photograph, a video, a painting, a sculpture, a drawing, a sketch, a sound recording, a musical score, song lyrics, a screenplay, a book, a short story, a collectible, a domain name, intellectual property, an article, an item of fashion apparel, gems, jewelry, an item of digital art, an aircraft, a boat, a real property.

11. A method for managing encumbrances associated with assets using a secure, immutable ledger, the method comprising:
identifying, by one or more processors, one or more encumbrances on an asset when the asset is transferred from one or more owners to one or more new owners;
generating, by the one or more processors, a transaction including a transfer of the asset from the one or more owners to the one or more new owners and a description of the one or more encumbrances;
augmenting, by the one or more processors, the transaction with one or more cryptographic hashes;
augmenting, by the one or more processors, the transaction with evidence of authenticity; and
recording, by the one or more processors, the transaction including the description of the one or more encumbrances in a secure, immutable ledger.

12. The method of claim 11, wherein the one or more encumbrances include at least one of:
(i) a first royalty percentage owed to a first owner,
(ii) a second royalty percentage owed to downstream owners other than the first owner,
(iii) a third royalty percentage owed to one or more parties other than the first owner and the downstream owners, or
(iv) a buyout option.

13. The method of claim 11, further comprising:
augmenting, by the one or more processors, the transaction with a cryptographic signature from the one or more owners to prove the identity of the one or more owners.

14. The method of claim 11, wherein the evidence of authenticity is generated by a third-party authority.

15. The method of claim 11, wherein the evidence of authenticity is generated by the one or more processors using one or more artificial intelligence elements, machine intelligence elements, or machine learning elements.

16. The method of claim 11, wherein information for the evidence of authenticity is obtained from an external evidence oracle or source.

17. The method of claim 11, further comprising:
transmitting, by the one or more processors, the transaction to a smart contract that includes an ancillary text component and is configured to automatically distribute royalties upon transfer of the asset to another owner in accordance with the encumbrance.

18. The method of claim 11, further comprising:
automatically generating, by the one or more processors, a contract, an enforcement action, or a report using one or more artificial intelligence elements, machine intelligence elements, or machine learning elements.

19. The method of claim 11, further comprising:
automatically predicting, by the one or more processors, a price or price range of the asset using one or more artificial intelligence elements, machine intelligence elements, or machine learning elements.

20. The method of claim 11, wherein the asset is at least one of: shoes, a trading card, memorabilia, a comic book, a vehicle, a stamp, a coin, a photograph, a video, a painting, a sculpture, a drawing, a sketch, a sound recording, a musical score, song lyrics, a screenplay, a book, a short story, a collectible, a domain name, intellectual property, an article, an item of fashion apparel, gems, jewelry, an item of digital art, an aircraft, a boat, a real property.

* * * * *